United States Patent
Lee et al.

(10) Patent No.: US 11,121,519 B2
(45) Date of Patent: Sep. 14, 2021

(54) UTILIZATION OF TIME AND SPATIAL DIVISION MULTIPLEXING IN HIGH POWER ULTRAFAST OPTICAL AMPLIFIERS

(71) Applicant: IMRA America, Inc., Ann Arbor, MI (US)

(72) Inventors: Kevin F. Lee, Ann Arbor, MI (US); Martin E. Fermann, Dexter, MI (US)

(73) Assignee: IMRA America, Inc., Ann Arbor, MI (US)

( * ) Notice: Subject to any disclaimer, the term of this patent is extended or adjusted under 35 U.S.C. 154(b) by 477 days.

(21) Appl. No.: 16/218,065

(22) Filed: Dec. 12, 2018

(65) Prior Publication Data

US 2019/0190224 A1 Jun. 20, 2019

Related U.S. Application Data

(60) Provisional application No. 62/607,829, filed on Dec. 19, 2017.

(51) Int. Cl.
*H01S 3/067* (2006.01)
*H01S 3/00* (2006.01)
(Continued)

(52) U.S. Cl.
CPC .......... *H01S 3/06712* (2013.01); *H01S 3/005* (2013.01); *H01S 3/0057* (2013.01);
(Continued)

(58) Field of Classification Search
CPC .................................................. H01S 3/2383
See application file for complete search history.

(56) References Cited

U.S. PATENT DOCUMENTS 5,566,196 A 10/1996 Scifres
5,694,408 A 12/1997 Bott et al.
(Continued)

FOREIGN PATENT DOCUMENTS

WO WO-2017108825 A1 * 6/2017 ............. G02B 27/10

OTHER PUBLICATIONS

Kienel et al. "Multidimensional coherent pulse addition of ultra-short laser pulses", Optics Letters, vol. 40, No. 4 pp. 522-525 (Feb. 15, 2015) (Year: 2015).*

(Continued)

*Primary Examiner* — Eric L Bolda
(74) *Attorney, Agent, or Firm* — Knobbe, Martens, Olson & Bear, LLP

(57) ABSTRACT

In an example amplifier system, an input pulse train is passed through an optical stage that splits each pulse into two or more pulses. These divided pulses are then injected into at least two amplifiers for amplification. The amplified pulses are subsequently passed back through the same optical stage in order to combine the pulses back into one high energy pulse. The amplifier system can use time division multiplexing (TDM) and/or spatial division multiplexing (SDM) to produce, e.g., four pulses in conjunction with two amplifiers and propagation through two optical beam splitters, which are coherently combined into a single output pulse after amplification. The amplifiers can comprise fiber amplifiers or bulk amplifiers.

33 Claims, 16 Drawing Sheets

(51) Int. Cl.
*H01S 3/23* (2006.01)
*H01S 3/10* (2006.01)
*H01S 3/13* (2006.01)
*H01S 3/094* (2006.01)
*H01S 3/08* (2006.01)

(52) U.S. Cl.
CPC ........ *H01S 3/0085* (2013.01); *H01S 3/06737* (2013.01); *H01S 3/08059* (2013.01); *H01S 3/094019* (2013.01); *H01S 3/2383* (2013.01); *H01S 3/0071* (2013.01); *H01S 3/06754* (2013.01); *H01S 3/1003* (2013.01); *H01S 3/1307* (2013.01); *H01S 3/2308* (2013.01)

(56) References Cited

U.S. PATENT DOCUMENTS

| | | | |
|---|---|---|---|
| 5,946,130 | A | 8/1999 | Rice |
| 6,233,085 | B1 | 5/2001 | Johnson |
| 6,366,356 | B1 | 4/2002 | Brosnan et al. |
| 6,400,871 | B1 | 6/2002 | Minden |
| 6,597,836 | B2 | 7/2003 | Johnson et al. |
| 6,678,288 | B2 | 1/2004 | Rice |
| 6,708,003 | B1 | 3/2004 | Wickham et al. |
| 6,813,069 | B2 | 11/2004 | Rice et al. |
| 7,065,110 | B2 | 6/2006 | Rice et al. |
| 7,107,795 | B2 | 9/2006 | Cheo |
| 7,120,175 | B2 | 10/2006 | Rothenberg et al. |
| 7,187,492 | B1 | 3/2007 | Shay |
| 7,221,499 | B2 | 5/2007 | Rice et al. |
| 7,440,174 | B2 | 10/2008 | Rice et al. |
| 8,158,493 | B2 | 4/2012 | Shah et al. |
| 8,228,599 | B1 | 7/2012 | Carbon et al. |
| 8,456,736 | B2 | 6/2013 | Wise et al. |
| 8,736,954 | B2 | 5/2014 | Fermann et al. |
| 9,240,669 | B2 | 1/2016 | Papadopoulos et al. |
| 9,276,372 | B2 | 3/2016 | Haensel et al. |
| 9,417,366 | B2 | 8/2016 | Rothenberg |
| 9,484,709 | B2 | 11/2016 | Klenke et al. |
| 2009/0273828 | A1 | 11/2009 | Waarts et al. |
| 2012/0230353 | A1 | 9/2012 | Xu et al. |
| 2015/0043597 | A1 | 2/2015 | Yusim et al. |
| 2015/0063380 | A1 | 3/2015 | Liu |

OTHER PUBLICATIONS

T. Y. Fan, "Laser Beam Combining for High-Power High-Radiance Sources", IEEE Journal of Selected Topics in Quantum Electronics, vol. 11, No. 3, May 2005, pp. 567-577.

TW. Hansch et al., "Laser Frequency Stabilization by Polarization Spectroscopy of a Reflecting Reference Cavity," Optics Communications, vol. 35, No. 3, Dec. 1980, 4 pages.

H. Itoh et al., "Femtosecond pulse delivery through long multimode fiber using adaptive pulse synthesis", Japanese Journal of Applied Physics, vol. 45, Part 1, No. 7, Jul. 7, 2006, pp. 5761-5763.

J. Limpert et al., "Performance Scaling of Ultrafast Laser Systems by Coherent Addition of Femtosecond Pulses," IEEE Journal of Selected Topics in Quantum Electronics, vol. 20, No. 5, Sep. 2014, 10 pages.

J. Montoya et al., "Transverse-Mode Instability Mitigation using Photonic-Lantern Adaptive Spatial Mode Control", Conference on Lasers and Electro-Optics, CLEO: Science and Innovations 2017, San Jose, California, May 14, 2017, 2 pages.

X. Shen et al., "Compensation for multimode fiber dispersion by adaptive optics", Optics Letters, vol. 30, N. 22, Nov. 15, 2005, pp. 2985-2987.

H. Stark et al., "Electro-optically controlled divided-pulse amplification," Optics Express, vol. 25, No. 12, Jun. 12, 2017, 10 pages.

K. Yang, "Parallel fiber amplifiers with carrier-envelope drift control for coherent combination of optical frequency combs", Laser Physics, vol. 24, No. 12, Oct. 9, 2014, 6 pages.

T. Zhou et al., "Coherent pulse stacking amplification using low-finesse Gires-Tournois interferometers," Optics Express, vol. 23, Issue 6, Mar. 23, 2015 pp. 7442-7462.

* cited by examiner

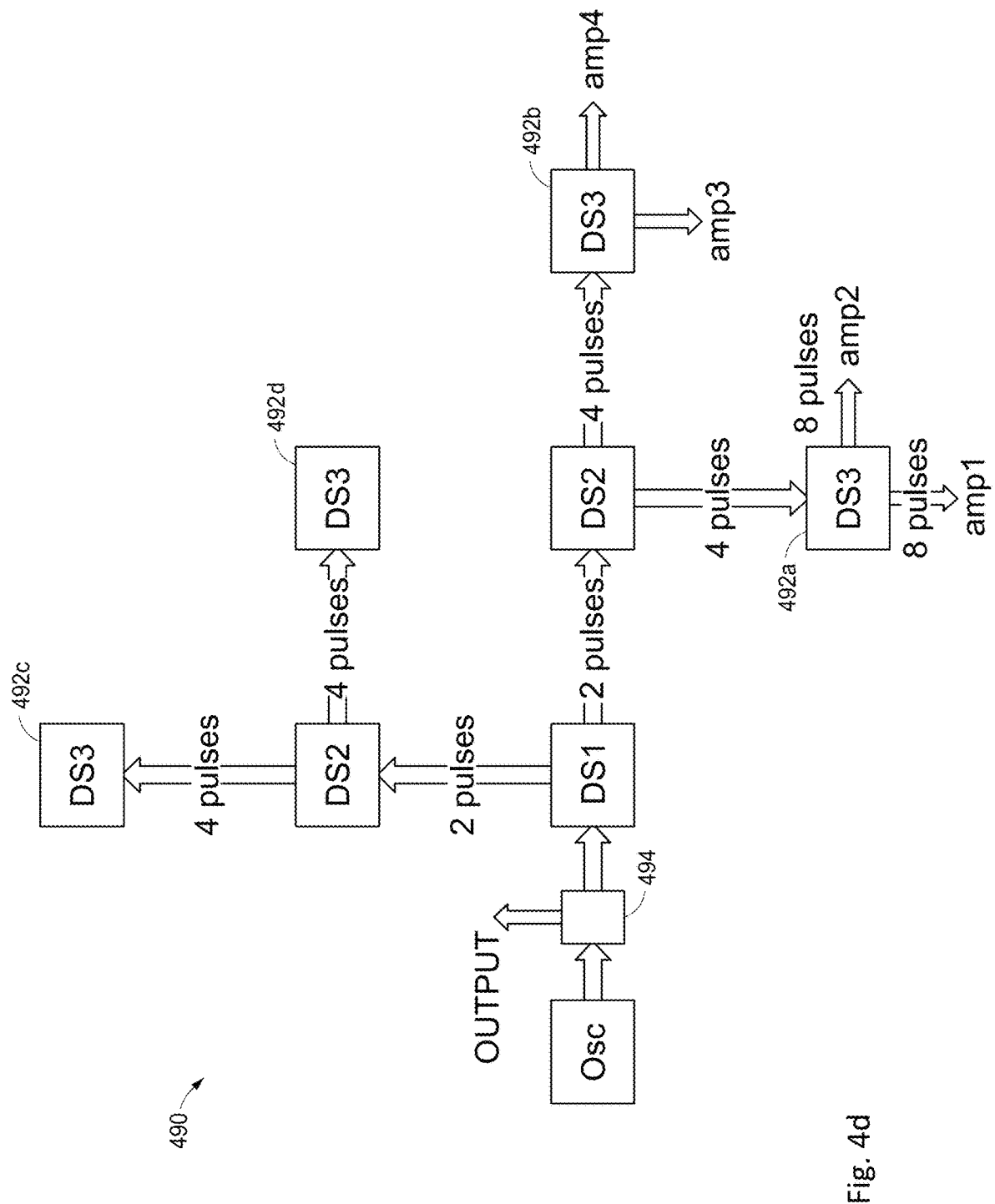

UTILIZATION OF TIME AND SPATIAL DIVISION MULTIPLEXING IN HIGH POWER ULTRAFAST OPTICAL AMPLIFIERS

CROSS-REFERENCE TO RELATED APPLICATIONS

This application claims the benefit of priority to U.S. Provisional Patent Application No. 62/607,829, filed Dec. 19, 2017, entitled "Utilization of time and spatial division multiplexing in high power ultrafast optical amplifiers," which is hereby incorporated by reference herein in its entirety.

BACKGROUND

Field

This disclosure relates to the field of ultra-high peak power laser systems and more particularly to time or spatial division multiplexing for obtaining ultra-high power.

Description of Related Art

Efficient amplification in fiber amplifiers generally requires extended amplifier lengths which results in substantial exposure of the fibers to optical nonlinearities at elevated power levels. For example, it has been shown that due to self-focusing, the obtainable peak power in Yb fiber amplifiers is limited to around 5 MW at a wavelength of 1050 nm. Other challenges in ultra-high power laser systems exist.

SUMMARY

The present disclosure relates to the design of ultra-compact, high-power, high energy optical pulse sources and their applications.

Prior methods for generating high energy pulses by combining multiple, lower energy pulses often require several sensitive actuators to achieve continuous combination of the lower energy pulses into high energy pulses. Various embodiments of the present disclosure greatly reduce the number of actuators required to generate high energy pulses. For example, some such embodiments may utilize one actuator for dividing a single pulse into, e.g., eight pulses for amplification, and coherently recombining the amplified pulses into one high energy pulse, resulting in a simpler implementation or more robust performance.

According to a general embodiment of the system an input pulse train is passed through an optical stage that splits each pulse into two or more pulses. These divided pulses are then injected into at least two amplifiers for amplification. The amplified pulses are subsequently passed back through the same optical stage in order to combine the pulses back into one pulse.

In a first embodiment, an amplifier system comprising time division multiplexing (TDM) and spatial division multiplexing (SDM) is used to produce four pulses in conjunction with two amplifiers and propagation through two optical beam splitters, which are coherently combined into a single output pulse after amplification.

In a second embodiment, an amplifier system comprising TDM and SDM is used to produce 8 pulses in conjunction with 2 amplifiers and propagation through 3 optical beam splitters, which are coherently combined into a single output pulse after amplification.

In a third embodiment, an amplifier system comprising TDM and SDM is used to produce 8 pulses in conjunction with 2 amplifiers and propagation through 3 optical polarizing beam splitters, which are coherently combined into a single output pulse after amplification.

In a fourth embodiment, an amplifier system comprising TDM and SDM is used to produce 16 pulses in conjunction with 4 amplifiers and propagation through multiple optical polarizing beam splitters, which are coherently combined into a single output pulse after amplification.

In a fifth embodiment, coherent addition for the construction of a high power frequency comb is disclosed.

In a sixth embodiment, the mitigation of amplifier saturation and self-phase modulation in conjunction with coherent addition via SDM or TDM is disclosed.

In a seventh embodiment, the utilization of bi-directional amplifiers for coherent addition via SDM or TDM is disclosed.

Arrays of fibers in conjunction with TDM allow for the generation of pulses with peak powers 10-100 times higher than the self-focusing limit of optical fibers at average powers above the 100 W range.

The amplifiers can comprise fiber amplifiers. The fibers can be polarization maintaining and can be fully compatible with cladding and side-pumping schemes and, therefore, power scalable with achievable output powers limited, for example, by thermal considerations. The fiber amplifiers can comprise a fiber arranged to include a partial or complete loop (or loops) disposed between two spatially offset segments of fiber. The amplifiers additionally or alternatively can comprise bulk amplifiers (e.g., optionally with a retroreflector).

Appropriate schemes for phase detection and control of the phase among different fibers according to the above embodiments are described. Optical phase control can be conducted with heterodyne phase detection in various configurations.

Phase detection and control can be furthermore conveniently performed via the exploitation of polarization sensing.

Optical phase control can also be implemented based on fast genetic algorithms for increasing or maximizing the peak power as an optimization target.

In an eighth embodiment, a parametric amplifier pumped by a coherently combined TDM/WDM system is described.

In a ninth embodiment, a mode locked oscillator based on SDM or TDM is disclosed. Other embodiments are described below.

The embodiments described herein can be used for applications including high power machining applications, frequency combs, pumping of optical parametric amplifiers as well as for plasma, ultraviolet (e.g., VUV, EUV), and X-ray generation, or generally, where power scaling is desired but otherwise limited by nonlinear effects or device damage.

The foregoing summary and the following drawings and detailed description are intended to illustrate non-limiting examples but not to limit the disclosure.

BRIEF DESCRIPTION OF THE DRAWINGS

Aspects of the present disclosure will become more apparent by the following description of example, non-limiting embodiments with reference to the accompanying drawings. The drawings are for illustrative purposes and are not to scale. Where practical, like reference numerals or reference labels may be used in the figures to indicate similar or like elements or functionality.

FIG. 4d is a block diagram for an example amplifier system configured to split an input pulse into 64 pulses, amplify them in 8 fiber amplifiers, and recombine them into a high energy output pulse.

DETAILED DESCRIPTION

Overview

Figure 1:
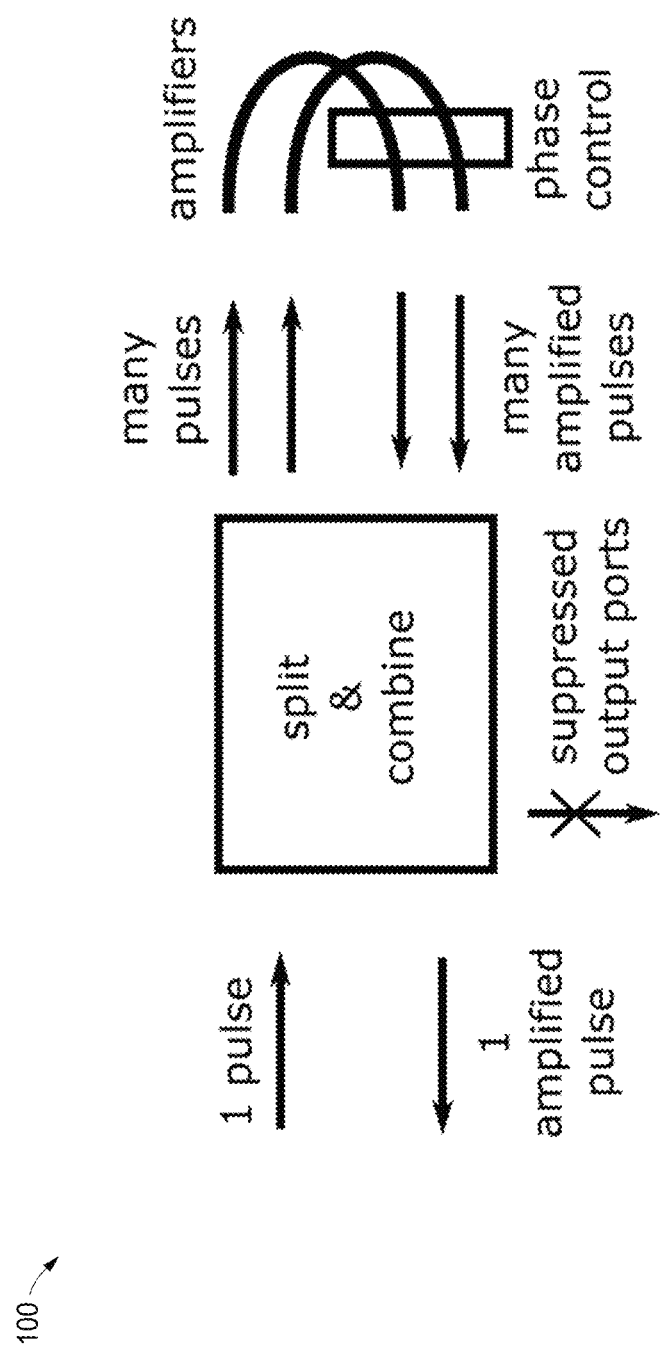
FIG. 1 is a diagram of an example of the effective use of pulse splitting and recombination with one optical element for high power pulse amplification.

In order to overcome the general nonlinear limitations of optical fibers, multicore fiber designs (e.g., D. Scrifres, U.S. Pat. No. 5,566,196, Cheo et al., U.S. Pat. No. 7,107,795, Fermann U.S. Pat. No. 8,736,954) have been suggested. Multicore fiber designs allow power scaling via a spatial division multiplexing (SDM) technique, spreading the signal intensity over many cores, thus mitigating nonlinear effects. Other SDM methods are based on coherent addition of individual fiber amplifier arrays to tile a plane or filled aperture approaches as well as wavelength division multiplexing (WDM). The latter method allows beam combination via wavelength-selective optical elements, where each fiber laser in the array is designed to operate on a different wavelength (or wavelength range). A review of SDM methods is given by for example, in T. Y. Fan, 'Laser Beam Combining for High-Power High-Radiance Sources', IEEE J. Sel. Top. in Quantum Electronics, vol. 11, pp. 567 (2005).

SDM has also been exploited for power scaling in conjunction with amplification in multi-mode fiber, spreading the power among a number of modes in the multi-mode fibers (J. Montoya et al., Transverse-Mode Instability Mitigation using Photonic-Lantern Adaptive Spatial Mode Control', paper SM1L.6, Conf. on Lasers and Electro-Optics', CLEO (2017) or using the excitation of stable principle modes in such multi-mode fibers, as discussed for example in H. Itoh et al., 'Femtosecond pulse delivery through long multi-mode fiber using adaptive pulse synthesis', J. J. Appl. Phys., 45, 5761 (2006); X. Shen et al., 'Compensation for multimode fiber dispersion by adaptive optics, Opt. Lett., 30, 2985 (2005)].

These SDM methods have varying degrees of difficulty when applied to power scaling of ultra-short pulses and can be very expensive since a multitude of actuators is typically required to coherently combine a set of pulses derived via SDM from fiber arrays, multi-core or multi-mode fibers.

Nevertheless coherent addition via SDM has been demonstrated by many groups, e.g.: E. Bott et al., U.S. Pat. No. 5,694,408; Rice et al., U.S. Pat. No. 5,946,130; Brosnan et al., U.S. Pat. No. 6,366,356; Johnson et al., U.S. Pat. No. 6,233,085; M. Minden, U.S. Pat. No. 6,400,871; Rice et al., U.S. Pat. No. 6,597,836; Rice et al., U.S. Pat. No. 6,678,288; M. Wickham et al., U.S. Pat. No. 6,708,003; R. Rice et al., U.S. Pat. No. 6,813,069; R. Rice et al., U.S. Pat. No. 7,065,110; T. Shay et al., U.S. Pat. No. 7,187,492; Rothenberg et al., U.S. Pat. No. 7,120,175; Rice et al., U.S. Pat. No. 7,221,499, Rice et al., U.S. Pat. No. 7,440,174; Carbon et al., U.S. Pat. No. 8,228,599; Rothenberg et al. U.S. Pat. No. 9,417,366.

Another method for expanding the power limitations of fiber technology has been the implementation of time division multiplexing (TDM) for peak power scaling. In an example of TDM, a pulse is spread in the time domain (e.g., divided into multiple lower-energy pulses at least partially spaced apart in time). The divided, lower-energy multiple pulses are amplified, and recombined to a high peak power pulse, as for example described in Wise et al., U.S. Pat. No. 8,456,736; Papadopoulos et al., U.S. Pat. No. 9,240,669 and Klenke et al., U.S. Pat. No. 9,484,709.

These methods also have various limitations, such as the need for bi-directional amplifiers (in '736 and '669) or the need for a relatively complex assembly. '709 is an example of the combination of SDM with TDM for pulse power scaling, however, the system is relatively complex and requires high bandwidth phase control electronics.

Example High-Power Systems

A general illustration of the concept related to the embodiments of the disclosed high power laser amplifier systems is shown in FIG. 1. At the input of the system 100, there is a laser pulse train that is to be amplified. Each pulse of the pulse train is passed through an optical arrangement that splits each pulse into two or more pulses. These divided pulses are then injected into at least two amplifiers to be amplified. Since the original pulse train is divided into a higher number of pulses, the overall energy content in the pulse train can be significantly increased, as the peak power and pulse energy of each individual pulse is significantly reduced, resulting in reduced detrimental nonlinear processes in the amplifiers. The amplified pulses are subsequently passed back through the same optical arrangement in order to combine the pulses back into one pulse.

In a conventional optical arrangement, for example comprising separate Mach-Zehnder interferometers for pulse splitting and recombination, the pulses would generally split again, resulting in a disorganized set of many pulses. In '709, this issue is addressed by precisely controlling the path lengths in the interferometers with many actuators and precision optical phase control, leading to a very complex system.

In many of the embodiments presented here, only one interferometer is used (for splitting and recombining), reducing the size of the assembly and allowing for system operation with control of the relative phase between the two optical amplifiers. For example, certain embodiments utilize only one controllable actuator (at, e.g., 100 Hz-10 kHz) to maintain the phase between the amplifiers.

Figure 2:
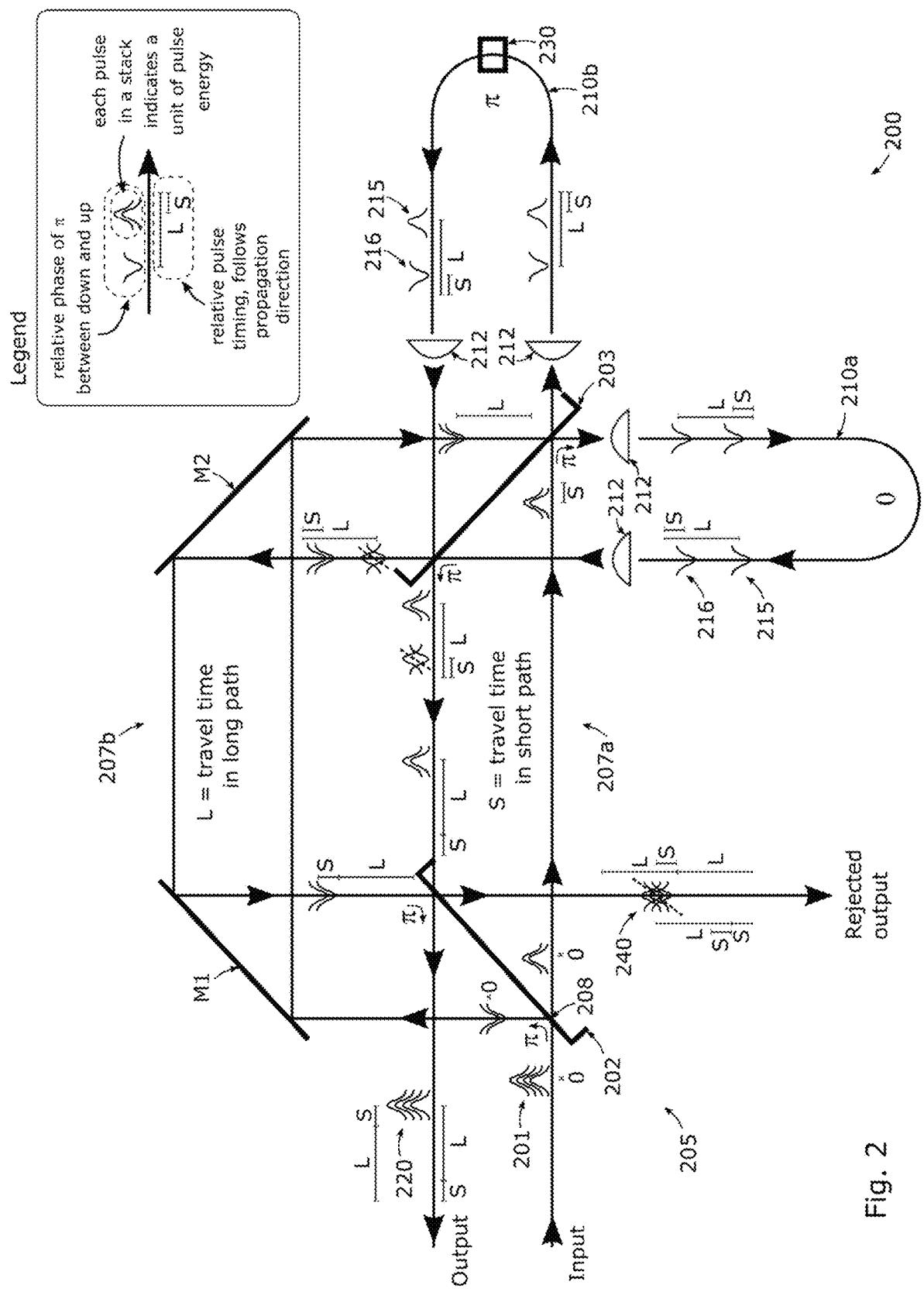
FIG. 2 is diagram of an example of a system for the amplification of two pulses for each input pulse in each of two fiber amplifiers via a combination of TDM and SDM.

A design example according to a first embodiment of an amplifier system 200 is shown in FIG. 2. The input pulse can be generated from any source of short pulses, derived for example from a Q-switched or modelocked laser with appropriate additional amplifiers used up-stream from the amplifier system to provide enough seed power. The modelocked laser can comprise a fiber laser. The input pulses can be un-chirped or chirped in the time domain to enable the implementation of chirped pulse amplification (CPA) with an additional pulse compressor located downstream from the system. A pre-amplifier (e.g., fiber-based) can be disposed downstream of the source to pre-amplify the pulses before inputting to the TDM/SDM stages. The input can comprise a pulse picker configured to select a subset of pulses generated by the source and to pass them to the TDM/SDM downstream components. The system 200 is designed to enable a pulse to be split into two pairs of pulses, which are then coupled into two different amplifiers. Thus a total of 4 pulses are generated. The same pulse splitting unit is then also used for recombination of the pulses producing one single pulse at the output of the system.

FIG. 2 shows a schematic for the amplifier system 200. Individual pulses are drawn as stacks of pulses for keeping track of pulse energy, with each pulse in a stack indicating a unit of pulse energy. No loss or gain is shown for simplicity. A set of pulses is redrawn once before and after each beam splitter. The up or down direction of the drawn pulse is for keeping track of the relative phases of the pulses when they recombine. The beam splitters 202, 203 are drawn as glass with a reflective surface to keep track of the phase change upon reflection. For example, the input beam pulse approaching the splitter 202 from the left hits the reflecting surface before the glass. In this example, it is assumed that there is a π radian phase shift when reflecting from air off the reflective surface, and zero phase shift when reflecting from within the material. The reflections that add a π phase shift are indicated on FIG. 2 with a "π" and a curved arrow. The phase shift values are approximations, but in an actual implementation, deviations from these approximations can usually be corrected by mirror alignment to achieve the desired result.

The input beam pulse 201 is split by a first beam splitter 202 into a long and short path 207b and 207a before being split again at a second beam splitter 203. In FIG. 2, the input pulse 201 is shown as a stack of four pulses to illustrate that the energy of the input pulse (before splitting into multiple temporally-spaced pulses) is larger than the energy of each of the time-split pulses. Such progressive splitting, and subsequent recombination, can be further extended if additional pulses are desired, as will be discussed below. The pulses will acquire different time delays depending on which path the pulse traveled through. This is tracked schematically in FIG. 2 as an illustrated spacing between pulses, with marked time delays of L or S for travel in the long or short path respectively. The direction of the delay markings follows the actual spatial relationship of the pulses, so that a pulse that is drawn ahead along the beam path will arrive earlier in time. The delays marked are relative, but the time of first splitting (at 208) may be thought of as the time origin, as the pulses have no relative delay up to that point.

The long path 207b comprises two mirrors M1, M2. The system thus comprises a classical Mach-Zehnder interferometer (MZI) 205, comprising two mirrors and two beam splitters which generates two optical beams containing two pulses each. In the example of FIG. 2, the two beams are coupled via beamsplitter 203 and lenses 212 into two separate optical fibers 210a, 210b for amplification. As discussed above, FIG. 2 shows a unity gain arrangement for illustrating pulse evolution. In an active system the fibers 210a, 210b may include at least a section that is doped with a gain medium (e.g., a rare earth element) to provide optical amplification. A fiber may include a single mode fiber or include large core fiber configured for single mode operation. Optical pump sources can be used to pump the gain medium. The fiber arms may also include devices such as isolators and pump light couplers for providing for amplification. The two fiber arms can be arranged to add the same time delay to both sets of pulses, so this common delay is not included in the delay indicators in FIG. 2. As noted above, the pulses leaving the amplifier fibers 210a, 210b in an active system will have higher energy (than when they entered the fiber) due to the gain in the fibers (however, for convenience of illustration in FIG. 2, the size of the pulses leaving each fiber does not reflect the increased energy they have).

In the example amplifier system shown in FIG. 2 (as well as in other figures), each amplifier fiber 210a, 210b comprises a section that is arranged in loop, with a first segment of the fiber (where pulses are input) spatially offset from a second segment of the fiber (where pulses are output) and with the loop disposed downstream of the first segment and upstream of the second segment. The loop may comprise a partially open loop. The beams leave the fibers and re-enter the MZI, with the fibers arranged so that each fiber arm behaves like a retroreflector, ideally sending the incoming beam back in an anti-parallel direction, but laterally offset in space as shown in FIG. 2. Optical elements 212 (e.g., lenses) can be used for coupling the beams in and out of the of the fiber ends (e.g., each input end and output end) and can be used to assist collimating the beams back into the MZI. In some embodiments the output beam(s) from the fibers 210a, 210b and beam splitter may be configured to share the clear aperture of splitter/mirrors as illustrated, which further facilitates construction of a compact arrangement.

The two returning beams from the respective fiber output ends meet at the second beam splitter 203. The combination at the beam splitter depends on the relative phases of the temporally-matched pairs of pulses from the two fiber arms 210a, 210b. By adding a π phase shift to one arm (e.g., the arm 210b in FIG. 2) relative to the other arm (e.g., the arm 210a), for example by adjusting the relative pulse timing of the two fiber arms, constructive interference directs the later pulses (215) to the short path inside the MZI, and the earlier pulses (216) to the long path of the MZI. Destructive interference is marked on FIG. 2 by a diagonal dashed line, where the pulse has low intensity. With this interference, the pulses travel once through a short path, and once through a long path. When they return to the splitter 202, they arrive at the same time and interfere constructively in one direction, resulting in a single pulse 220 leaving the system along the output path, but spatially offset from the input pulse 201.

A beam 240 from the splitter 202 is rejected output, which can in some implementations be reduced to low levels or used for interferometer stabilization (as further described below). Thus one input pulse is split into four separate pulses by a pulse splitter, amplified as two pulse pairs in two separate amplifiers, and recombined into a single pulse by the same pulse splitter. In various embodiments of the amplifier system, the single pulse that is output can contain greater than 30%, greater than 40%, greater than 50%, greater than 60% or more of the total energy of the individual amplified pulses produced by the two fiber arms.

The temporal pulse separation between the pulses of the pulse pairs is given by L−S, where L and S are the travel times for the long and the short paths 207b, 207a, respectively, described with reference to FIG. 2. While the paths may appear different in incoming and outgoing directions, the path lengths are actually the same when including the appropriate air path before and after the splitter. The pulse timings for recombination are thus automatically matched, reducing or avoiding the need to replicate and actively tune path lengths as performed in some other methods. The π phase shift in the arm 210b can be achieved using an actuator 230 with active feedback, e.g., a dither lock, a phase modulator, or a fiber stretcher can be inserted into the fiber arm as a phase or delay actuator. In some embodiments, only a single actuator with active feedback is used, which can be an advantage over other techniques that require use of multiple actuators.

Notably, no non-reciprocal optical elements to extract the recombined pulses are needed, since the output pulse 220 is spatially offset from the input pulse 201. Also, the amplifiers 210a, 210b can be used in uni-directional fashion which can be an advantage for high gain amplifiers. Moreover, a single pulse splitting element (e.g., the MZI 205) can be implemented for pulse splitting and recombination, allowing for a compact system construction, and simplifying phase control between the pulses. Further, no polarization manipulating elements are needed in this embodiment, as the device works with one single polarization. However, in other embodiments, half-wave plates can be inserted at the input to the system and at the input and output of the fibers to provide that the system operates in a preferred polarization direction. These half-wave plates are not separately shown.

Additionally, the transmission efficiency of the system 200 is relatively insensitive to uneven beam splitter splitting ratios. It can be shown that the transmission efficiency η is given by $\eta=(4RT)^2$, where R and T are the intensity reflection and transmission coefficients, respectively, of the beam splitters. In an example system 200 where R=45% and T=55%, the transmission efficiency η=98%, which is still very high.

Figure 3:
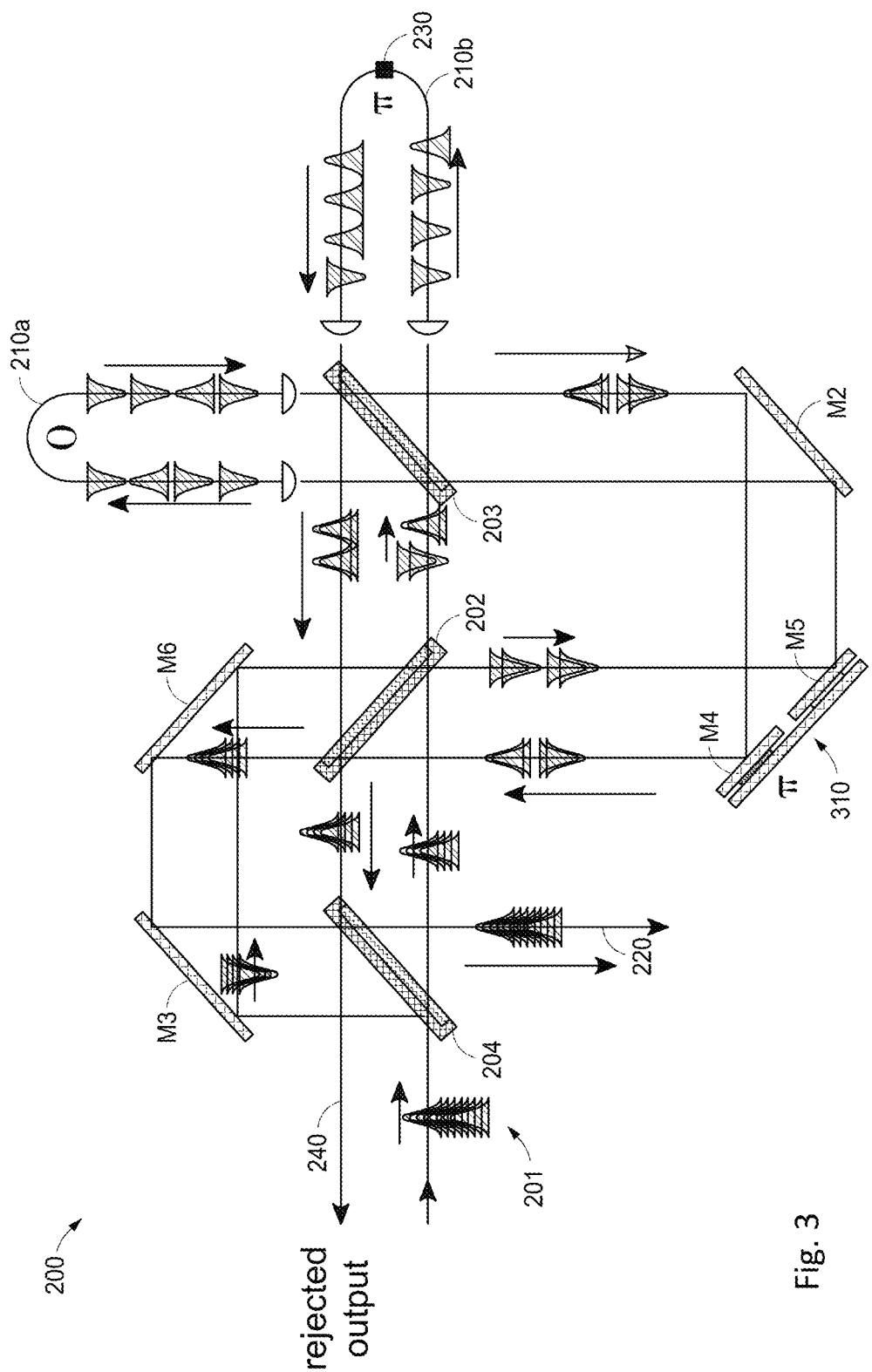
FIG. 3 is a diagram of an extension of the embodiment shown in FIG. 2 to the amplification of four pulses for each input pulse in each of two amplifiers generated via TDM and SDM.

Note that here the use of an MZI 205 was provided as an example in FIG. 2. Similar time pulse splitting and recombination can also be obtained with other arrangements of beam splitters and mirrors as part of other types of interferometers, for example, Michelson interferometers with imbalanced arm lengths. Additionally or alternatively other interferometric arrangement(s) may be implemented to achieve specific design objectives. As discussed above, with progressive splitting of an input pulse and reduction of peak power prior to amplification further expansion and power scaling becomes achievable. By way of example, FIG. 3 shows the expansion of the four pulse design to an eight pulse design, where two sets of 4 pulses are directed into two separate amplifiers. It is similar to the system shown in FIG. 2, with an additional beam splitter 204 at the input/output, and mirrors M3, M6 to create an additional time delay between another short path with time delay $S_2$ for light transmitted through this third beam splitter, and another long path with time delay $L_2$ for the light reflected from this third beam splitter. The additional time delay $L_2$–$S_2$ can preferably be selected such that $L_2$–$S_2$ is substantially longer or shorter than the time delay L−S; if S≈$S_2$ then 4 pulses with approximately the same pulse separation are generated when $L_2$≈2×L or $L_2$≈L/2. The two sets of pulses are coupled into two separate amplifiers 210a, 210b. The temporal separation within the sets of 4 pulses is preferably longer than the pulse duration.

An additional π phase shift is also used in the longest arm for directing the pulses into the appropriate path. FIG. 3 shows the phase shift coming from separate mirrors M4, M5 with slightly different positions. Adding a piezoelectric transducer 310 to control one or both positions of the mirrors M4, M5 provides additional adjustability. Another option is to use transmission in glass, for example a glass block in one beam path and a wedged glass pair with translation of one wedge with respect to the other to change the optical path length, as is commonly used for fine control in optics. Practically though, the desired behavior can be achieved with a single normal mirror by adjusting its angle, which controls phase through path length changes. Thus the π phase shift can, in some cases, be provided passively.

This system shown in FIG. 3 functions similarly to the system shown in FIG. 2. By adjusting phases and ensuring that the returning pulses are returning in a direction antiparallel to the input direction, the various time delays can be appropriately compensated so that a single pulse emerges at the output port, which is spatially offset from the input pulses.

Figure 3A:
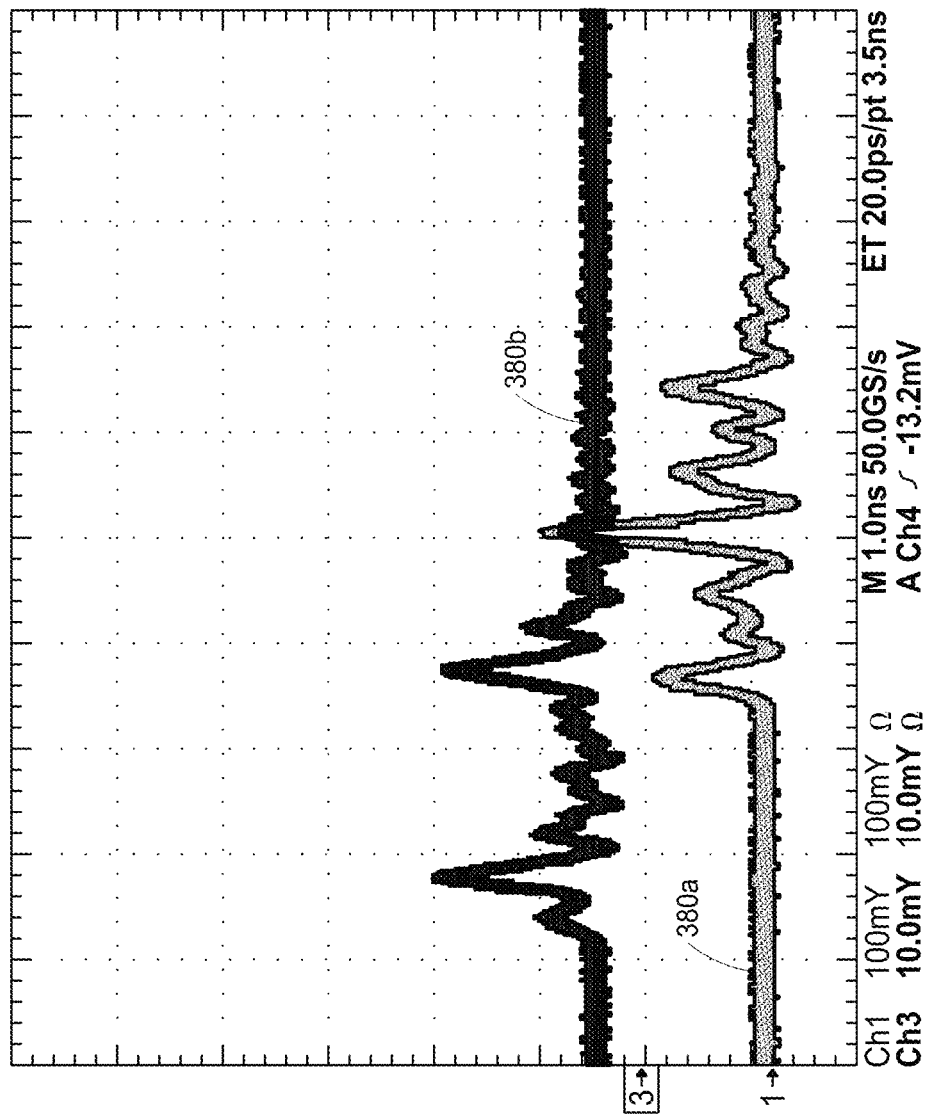
FIGS. 3A and 3B show measured oscilloscope traces of a photodiode measuring light emitted from the two output ports of an implementation based on the system shown in FIG. 3, without gain in the optical fibers.
Figure 3B:
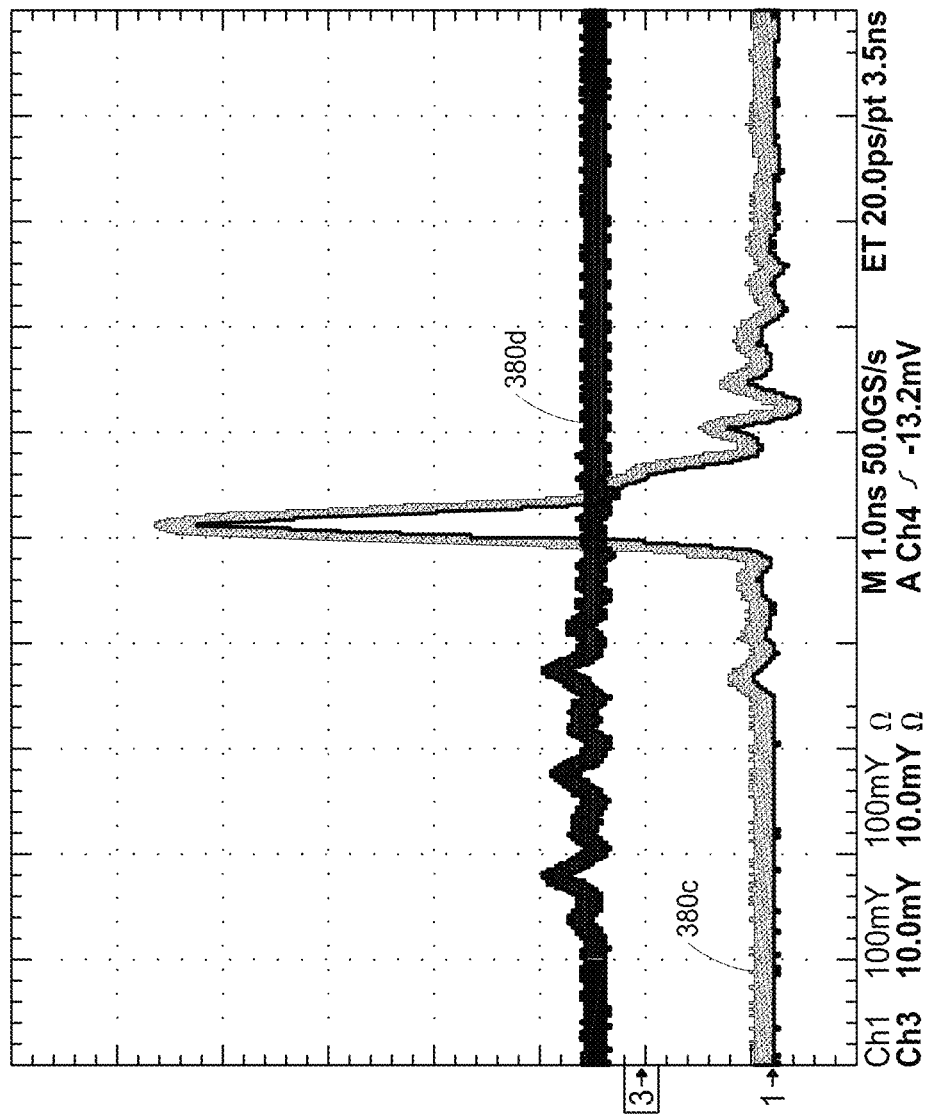

FIGS. 3A and 3B show measured oscilloscope traces of a photodiode measuring light emitted from the two output ports of an implementation based on FIG. 3, without gain in the optical fibers. In FIG. 3A, the phase delay between the two fiber arms 210a, 210b has been set to a random value, resulting in light distributed among the many possible pulse timings and similar amounts of light being emitted from both output ports (amplitudes of the pulses in traces 380a, 380b are about the same). In FIG. 3B, the phase delay between the fiber arms 210a, 210b has been adjusted to recombine the pulses well, resulting in most light being within one pulse leaving one output port (trace 380c), and small amounts of light in the other pulses leaving the other output port (trace 380d).

To ensure that all pulses see approximately the same dispersion, the beamsplitters 202, 203, 204 can be configured to have the reflecting structure embedded in the middle of a substrate. Alternatively, additional glass plates can be used inside the interferometer to equalize the dispersion among the pulses. Such arrangements are known from standard interferometry and not separately shown here.

Figure 4A:
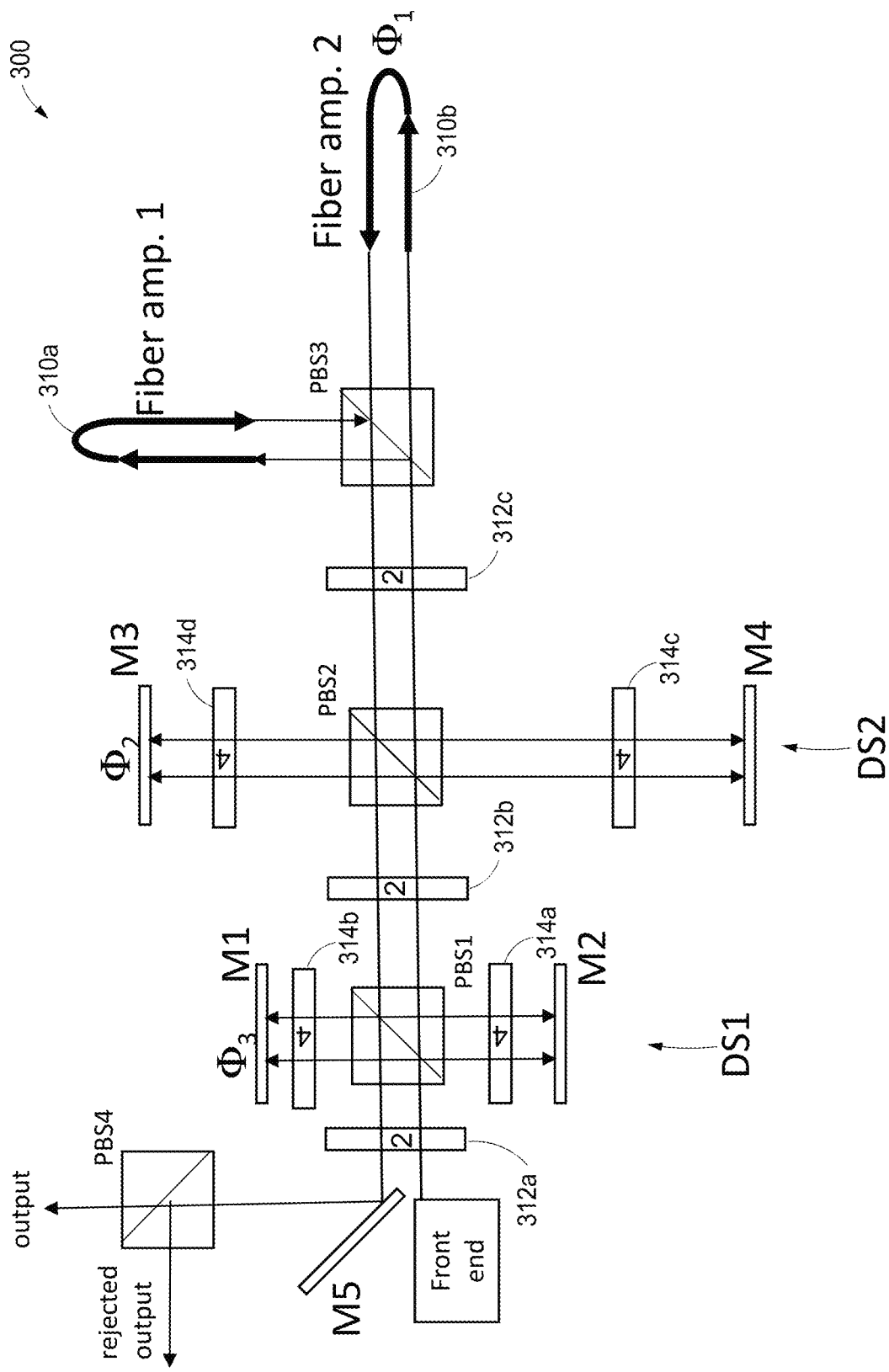
FIG. 4a is a diagram of an alternative embodiment for the amplification of high energy pulses via a combination of TDM and SDM with two fiber amplifiers.

An alternative embodiment with two sets of four pulses based on polarizing beam splitters (PBS) is shown in FIG. 4a. In this system 300, the pulses are derived from a short pulse source (front end) and directed to a first delay stage DS1, comprising a first polarizing beam splitter PBS1, which splits the pulses into two beams with pulses of orthogonal polarizations with equal amplitude, as ensured by a first half-wave plate 312a (indicated with numeral 2). The beam reflected at PBS1 is time-delayed with respect to the first beam via the shown arrangement of two reflective mirrors M1, M2 and quarter-wave plates 314a, 314b (indicated with numeral 4). In some embodiments, the front end comprises components of fiber-based chirped pulse amplification (FCPA) systems, for example comprising a mode-locked oscillator, preamplifiers, pulse pickers and/or pulse stretchers.

With appropriate adjustment of the reflective mirrors M1, M2, and PBS1, the first delay stage DS1 produces one beam containing two time delayed pulses with orthogonal polarizations. The same process is repeated at a second delay stage DS2 comprising half-wave plate 312b, mirrors M3, M4, quarter-wave plates 314c, 314d, and polarizing beam splitter PBS2, resulting in one beam containing 4 time delayed pulses with alternating orthogonal polarization directions. A half-wave plate 312c subsequently rotates the polarization states by 45° and splits the two sets of four pulses into two separate fiber amplifiers 310a, 310b. The two fiber amplifiers are preferably polarization maintaining (PM) and the pulses are coupled into one of the two polarization axes of the fibers.

The group delay along the two fibers is compensated and their phase difference $\Phi_1$ can be adjusted to a multiple of $\pi$, resulting in a polarization rotation of 90° upon recombination of the two beams from the two fibers at a polarizing beam splitter PBS3. Thus by using the phase difference of $\pi$ between the two amplifiers 310a, 310b, the combination of the two amplifiers with PBS3 acts like a Faraday rotator; upon back propagation through the delay stages DS2 and DS1, the 4 pulses recombine into one single pulse. Output can be extracted via mirror M5 and polarizing beam splitter PBS4.

Group delay and phase delay adjustment can be performed via a variety of means. For example fiber stretchers can be implemented somewhere along the fiber. Additional delay stages can also be inserted (not shown); control of the temperature of the fiber as well as the pump power offers additional alternatives for phase control. Also, deflector mirrors mounted onto piezo-electric elements can be implemented (not shown).

Since input and output are laterally offset with respect to each other, a total reflector can be used for extraction of the output beam. To ensure that all pulses see approximately the same dispersion, the input and output beams are offset from the polarizing beam splitters by the same amount from the center, as shown in FIG. 4a.

In FIGS. 2-4a, since the interferometer is operated in a double pass mode and the input and output beams are anti-parallel to each other, the free-space phase delays induced by the delay stages DS1 and DS2 are automatically compensated after a forward and backward propagation. Hence to first order, the relative optical phase and group delay between the two fibers (e.g., in amplifiers 210a, 210b, 310a, 310b) can be controlled to provide high quality recombination of the pulses.

In order to control the optical phase between the two fibers, different phase locking architectures can be used. For example the dither-lock technique can be implemented. In an actual example implementation, a phase modulator or a fiber stretcher can be inserted into a fiber arm as a phase or delay actuator. The modulator or fiber stretcher can be set to modulate the path delay at a frequency $\Omega$. A detector can measure the rejected signal coupled out of the interferometers. A Fourier component of the measured signal at the frequency $\Omega$, as extracted in this example by a lock-in amplifier (e.g., lock-in), provides an error signal that indicates the direction and magnitude of the offset of the phase that can be used to adjust the fiber stretcher for substantially continuous optimization of pulse combination.

Other signals can be measured for generating a feedback signal for stabilization. For example, for the system 300 shown in FIG. 3, the same rejected signal can be measured, but with time resolution for selecting a certain pulse or group of pulses from the many time delayed pulses generated in the interferometer. The time resolution can come from boxcar type circuits, which isolate time windows within electronic signals. For example, the main combined pulse and the pulses at slower or later times change oppositely in intensity as the relative phase of the arms is changed, so a combination of these two signals is less sensitive to amplitude fluctuations in the system. These signals also have simpler behavior than the average of all the pulses, improving the range over which it functions as a useful error signal. The beam can also be sampled at different points, within the optical paths in order to have simpler signals with fewer pulse delays involved, reducing cross-talk between pulse signals, and reducing timing requirements of the electronics.

The modulation and delay control functions may be performed by two different actuators. The first actuator preferably provides a high modulation bandwidth to provide a highly responsive error signal, while the second actuator can be slower, while providing a larger dynamic range for phase control. For example, the first actuator can be based on a fast electro-optic or acousto-optic modulator while the second actuator can be a slower piezoelectric fiber stretcher or a mirror mounted on a piezo-electric transducer.

Figure 4B:
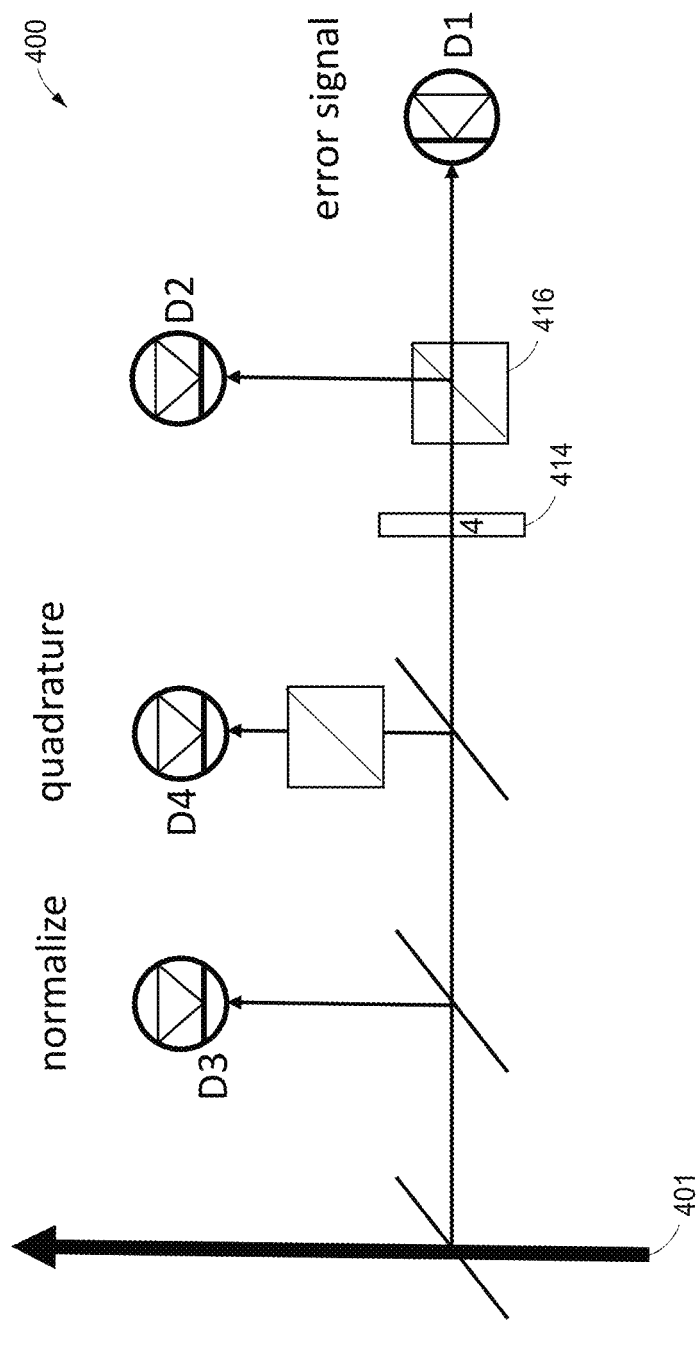
FIG. 4b is a diagram of an embodiment for measuring the polarization of light for use as a feedback error signal.

In the presence of small time-varying misalignments of the interferometer, the phases between the time delayed pulses, designated as $\Phi_2$ and $\Phi_3$ in FIG. 4a, can also be continuously adjusted. Here, the phases $\Phi_2$, $\Phi_3$ represent the phase delay induced by DS2 and DS1, respectively. To diagnose the phase correction needed to maintain pulse combination, a portion of the beam after recombination at PBS3 can be sampled, and the polarization measured, as illustrated in FIG. 4b. When properly phased, the output is linearly polarized at 45° with respect to one of the PBS3 axes, and elliptical or circularly polarized otherwise.

There are many ways to measure polarization. An example that generates an error signal for feedback control, as in the polarization sampling light detector 400 of FIG. 4b, is to take a sampled beam 401 (e.g., obtained via a beam-splitter), pass it through a quarter-wave plate 414, then a linear polarizer 416, and detect the transmitted light onto a photodiode D1 or photodiode pair D1, D2. The wave plate 414 converts the circular polarization from improperly phased arms into linear polarization, resulting in either maximum or minimum signal on the photodiode D1. The linear polarization resulting from properly phased arms converts to circular polarization, resulting in photodiode output halfway between the maximum and minimum signal. This halfway value can be used as the locking point for feedback to the phase actuators for active stabilization of the relative arm phases, with the required direction of motion indicated by the increase or decrease in the signal.

Some embodiments of the detector 400 may account for additional physical effects. One effect is that the detector may be relatively sensitive to amplitude noise. The influence of amplitude noise can be reduced or minimized with a balanced detector pair D1, D2 that measures the other polarization from the polarizer. Additionally or alternatively, amplitude noise can be corrected by sampling part of the beam before the polarizer for normalizing the measured signal after the polarizer as shown by the detector D3 in FIG. 4b. The other effect is the possibility of $2\pi$ phase jumps from fast changes. This may not occur for many devices, but it is possible to return to the same point by sampling the beam again, similarly to the error signal measurement but without the waveplate. This photodiode signal, detected with a detector D4 in FIG. 4b, is a quadrature signal for the error signal, allowing full tracking of phase changes. Electronic processing of quadrature signals is not discussed further here.

Further adjustments can be implemented for example with a slow genetic or slow stochastic parallel gradient descent algorithm (SPGD). In this technique, a small fraction of the output can for example be directed to a photo-detector and the output power can be continuously increased or maximized via small adjustments, for example, applied to mirrors M1 and M3 (e.g., shown in FIG. 4a), by mounting the mirrors M1 and M3 onto respective piezoelectric transducers. Preferably, in some embodiments, the output can be detected after a frequency doubling stage. Also, alternatively, the rejected output from the interferometer (for example in the wrong polarization state from PBS4 shown in FIG. 4a) can be reduced or minimized with the SPGD algorithm. The output in the wrong polarization stage can for example be extracted via the insertion of the polarizing beam splitter PBS4 in FIG. 4a and is alternatively accessible via the beam splitters 202, 204 in the systems 200 described with reference to FIGS. 2 and 3. These modulations can be applied at a much slower time scale than the modulation of the phase between the two fiber amplifiers, and therefore do not interfere with the phase control of the amplifiers.

Figure 4C:
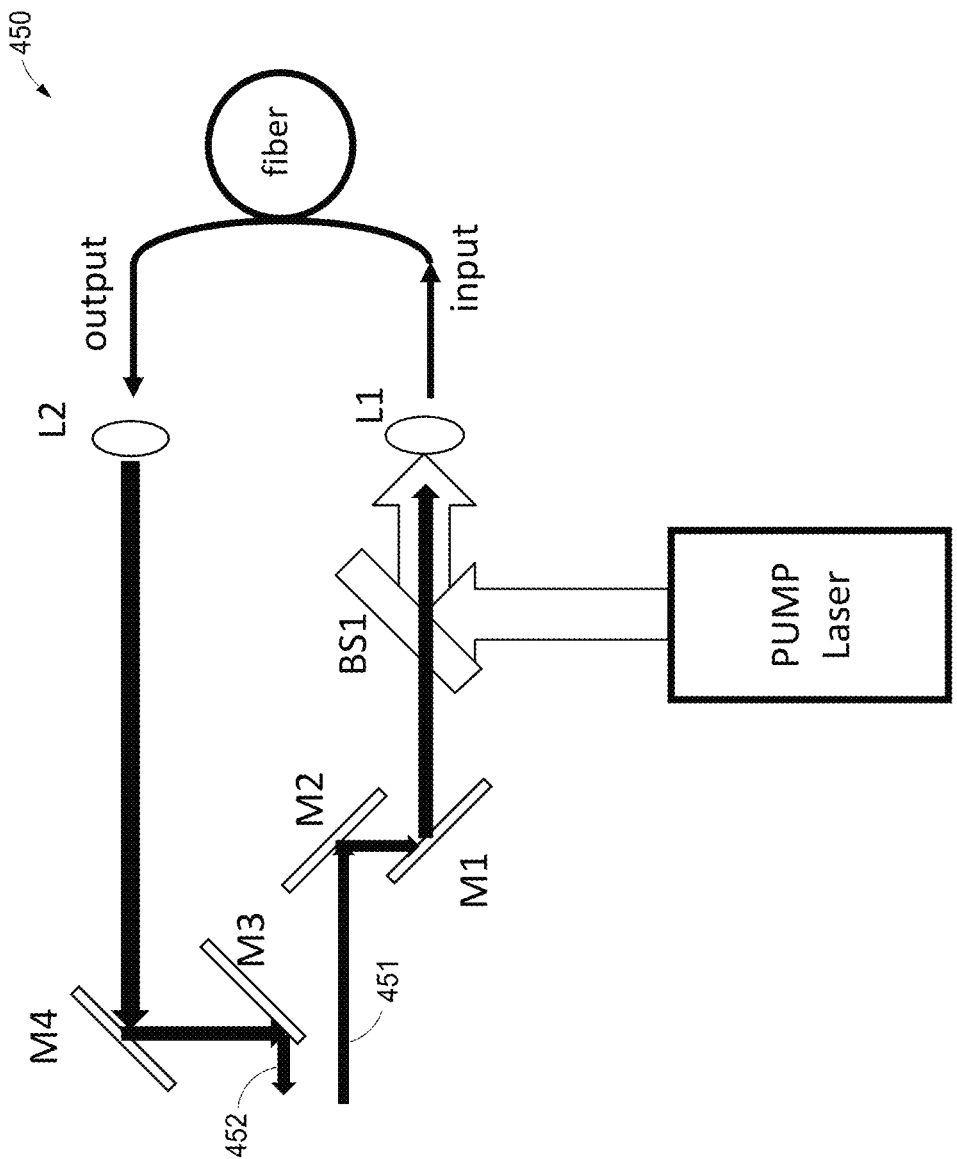
FIG. 4c is a diagram of an embodiment for coupling light in and out of fibers compatible with, e.g., embodiments of the amplifier systems described herein.

In general, also, it may be challenging to align two fibers (e.g., fibers 210a, 210b, 310a, 310b) and the corresponding coupling optics (e.g., lenses 212 in FIG. 2) to produce anti-parallel optical beams. Therefore, an arrangement 450 as shown in FIG. 4c can be used to separate the input and output end of each fiber. Here the input signal 451 is directed via mirrors M1 and M2, beam splitter BS1 and lens L1 to the fiber amplifier input end. Only one fiber is shown, but a similar arrangement can also be used for the other amplifier. Beam splitter BS1 is used to also direct the pump laser light to the fiber amplifier input. The fiber amplifier output is directed via lens L2, and mirrors M3 and M4 to be an anti-parallel and spatially offset beam 452 with respect to the input beam 451 and to overlap with the output beam from the second amplifier. Moreover, a small continuous adjustment of the mirror positions can be performed to ensure the parallelism of the two beams. Such adjustment can also be controlled via a genetic or an SPGD algorithm similar to the phase control of the individual delay stages DS1 and DS2. Where here a pump coupling arrangement via a beam splitter is shown, an all-fiber pump coupling arrangement via for example fiber star-couplers can be used which may be mechanically simpler to implement.

Whereas so far we have discussed examples of arrangements with m=2 amplifiers and n=2 or n=4 pulses, it is straightforward to extend this scheme to m=2 amplifiers and n=2*k pulses, where k is an integer greater than or equal to 1. In this case, any addition of k may utilize another delay stage. At the same time, an extension of these schemes to m=2*p amplifiers and n=2*k pulses is possible, where p, k are integers greater than or equal to 1.

FIG. 4d shows a block diagram for an example amplifier system 490 including m=8 fiber amplifiers and n=64 pulses. An oscillator (Osc) sends a pulse train to TDM delay stages DS1, DS2, and DS3. The delay stages can be based on, for example, the TDM stages described with reference to FIG. 2 or a modified version of FIG. 4a, where 2 time delayed pulses are produced from one input pulse with one delay stage. After the stage DS1, a single input pulse has been split into two pairs of pulses (4 pulses total). Each pulse pair is sent to a second TDM stage DS2, which produces two pulse pairs comprising 4 pulses each (16 pulses total since there are two DS2 stages). Each of these pulse pairs is sent to a stage DS3 that produces a further two pulse pairs comprising 8 pulses each (64 pulses total since there are four DS3 stages). Each 8-pulse group is sent to a fiber amplifier arm. In FIG. 4d, the amplifier arms amp1, amp2, amp3, and amp4 are explicitly shown for the DS3 stages 492a, 492b, but a pair of amplifier arms would also extend from DS3 stages 492c, 492d (not shown in FIG. 4d). The pulses injected by a DS3 stage into the amplifier arms are sent back through the same DS3 stage after amplification (with an appropriate phase offset). The pulses retrace their paths through the DS2 and DS1 stages and are output (e.g., using an output element 494 such as a mirror or polarizing beam splitter).

Table 1 shows the number of pulses, fiber amplifiers, and TDM stages used in the example system 490 described with reference to FIG. 4d.

TABLE 1

| Element | Pulses | Fiber Amplifiers | Stacking Stages |
|---|---|---|---|
| Oscillator | 1 | 0 | 0 |
| DS1 n = 1 | 4 | 0 (m = 2) | S = 1 |
| DS2 n = 2 | 16 | 0 (m = 4) | S = 2 |
| DS3 n = 3 | 64 | 8 (m = 8) | S = 4 |
|  | $2^{2n}$ | $2^n$ | $2^{n-1}$ |

Thus, in the illustrated system 490, the number M of pulses received by each amplifier (m=8 in this example) is greater than the number N of pulses initially split by the first splitting stage DS1 (where n=2 for each pulse pair propagating from DS1) due to the use of additional splitting stages DS2 and DS3 downstream of DS1.

Figure 5:
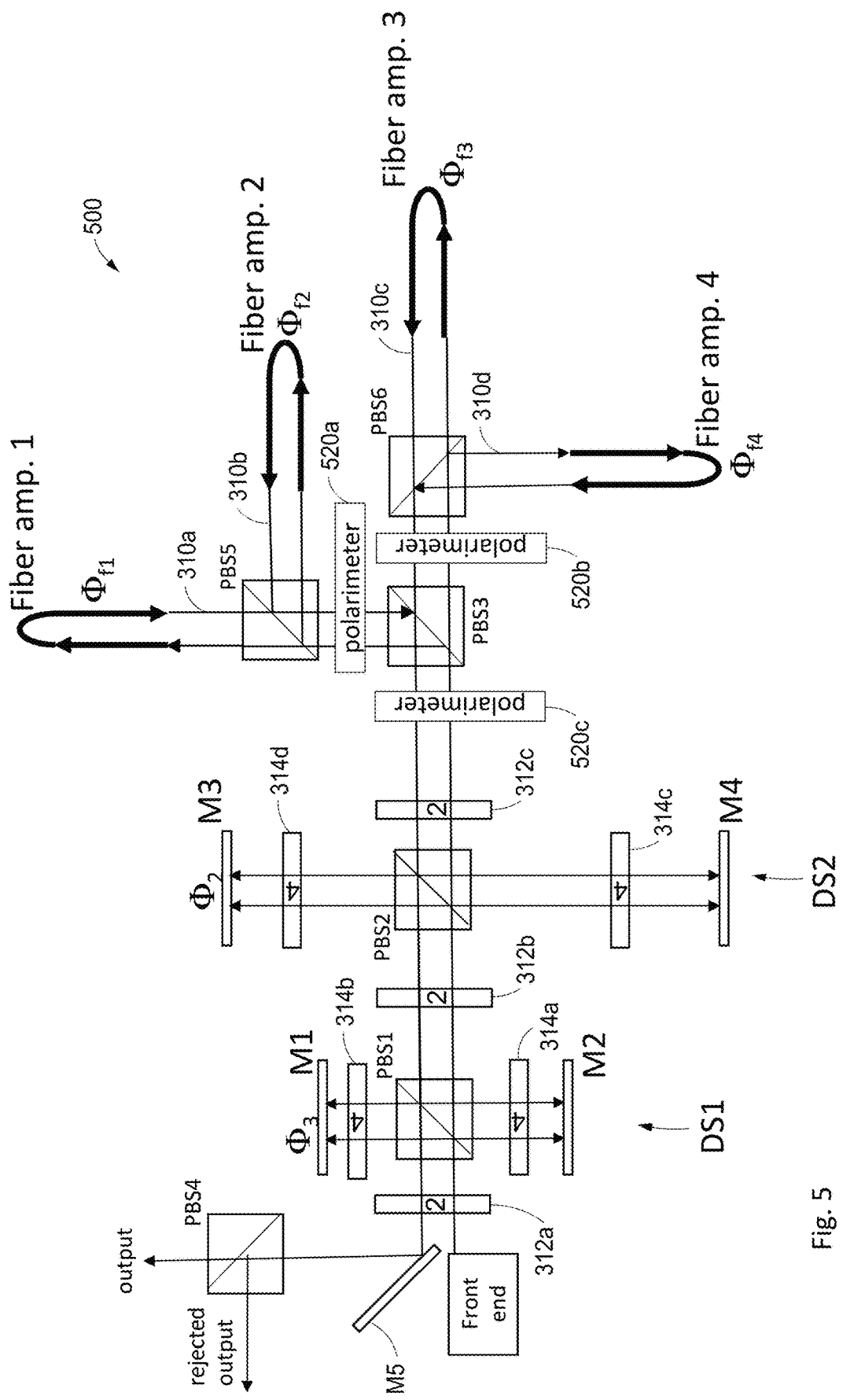
FIG. 5 is a diagram of an embodiment for the amplification of high energy pulses via a combination of TDM and SDM with 4 fiber amplifiers.

An example amplifier system 500 with m=4 amplifiers and n=4 pulses is shown in FIG. 5, which is based on the m=2, n=4 amplifier system 300 described with reference to FIG. 4a. Here via the addition of polarizing beam splitters PBS5 and PBS6 inserted into the two beam paths emerging from the polarizing beam splitter PBS3, 4 optical beams containing 4 pulses each are injected into fiber amplifiers numbered 1-4 (310a, 310b, 310c, and 310d). The difference between the fiber phases $\Delta_1 = \Phi_{f1} - \Phi_{f2}$ corresponding to the phase delay in amplifiers 1 and 2 can be arranged for example to ensure that the polarization at the output of PBS5 is the same as for the input to PBS5. The same can then be done for amplifiers 3 and 4, and $\Delta_2 = \Phi_{f3} - \Phi_{f4}$, and PBS6. To ensure increased or optimum recombination of all the pulses into a single pulse, the phases $\Phi_{f1} - \Phi_{f3}$ (or $\Delta_1 - \Delta_2$) can be further adjusted to produce a polarization rotation of 90° at the combination of the 4 amplifier beams at PBS3.

The system 500 can include one or more polarization sampling devices 520a, 520b, 520c, which are labeled as polarimeters in FIG. 5. One or more of the polarimeters can be similar to the polarization sampling light detector 400 described with reference to FIG. 4b. Each pair of fiber amplifiers can be stabilized on its own. For example, the polarimeter 520a can be used to stabilize the delay $\Delta_1$ in fiber amplifier pair #1 comprising amplifiers 310a, 310b via an appropriate actuator $A_1$ (located for example in amplifier #1 actuating on $\Phi_{f1}$), which can be similarly constructed to element 520, as shown in FIG. 3. In FIG. 5 the actuators are not separately shown. Similarly polarimeter 520b can be used to stabilize the delay $\Delta_2$ in fiber amplifier pair #2, comprising amplifiers 310c, 310d via another appropriate actuator, $A_3$, actuating for example on $\Phi_{f3}$ (note: the indexing on the actuators is selected to match the phase actuated, e.g., actuator $A_k$ actuates phase $\Phi_{fk}$). The two pairs of fiber amplifiers can be stabilized together using the polarimeter 520c after PBS3 by using another actuator, $A_4$, located in one of the two fiber amplifier pairs. The actuator $A_4$ can for example be located in fiber amplifier pair #2 (for example in amplifier 310d, actuating on $\Phi_{f4}$) and the system 500 can be configured to have polarimeter 520c actuate simultaneously $\Phi_{f3}$ and $\Phi_{f4}$, (with approximately the same amount of delay), so that the polarimeter 520c does not substantially affect the phase delay $\Delta_2$ inside amplifier pair #2.

This means that in the example system 500, three actuators and three polarization analyzers are used (e.g., the three polarimeters 520a-520c), with amplifier pair #1 having a first actuator and a first polarization analyzer to stabilize $\Delta_1$ (e.g., via the polarimeter 520a), and amplifier pair #2 having a second actuator and a second polarization analyzer to stabilize $\Delta_2$ (e.g., via polarimeter 520b) as well as a third actuator and a third polarization analyzer to adjust $\Delta_1 - \Delta_2$ (e.g., via the polarimeter 520c).

An alternative to measuring the polarization directly is to use a balanced cross-correlation method to control the timing of the pulses as is often used in, for example, coherent pulse synthesis methods. Balanced cross correlators can be used conveniently with beam-splitters as for the designs shown in FIGS. 2 and 3, where all beams are propagating in the same polarization state and the use of polarimeters may not be practical without implementation of additional polarization manipulating optical components. High precision balanced cross correlators have enough sensitivity to measure the group delay between two optical beams with a precision of a fraction of a wavelength, which can thus be used also for controlling the relative phase of two beams for coherent addition.

As an alternative to polarization measurement, the LOC-SET method (Locking of Optical Coherence via Single-detector Electronic-frequency Tagging) can be used to control the phase of the four amplifiers 310a-310d in FIG. 5. In an example embodiment one of the amplifiers can be used as a reference and the phase of the three other amplifiers can be effectively locked to the first amplifier. To enable phase locking, a pair comprising a phase modulator and a phase actuator, can be incorporated into each of the three other amplifiers. For example the phase modulator can be an acousto-optic or electro-optic modulator, and the phase actuator can be a fiber coiled onto a piezo-electric drum. In principle the phase modulator and actuator can be combined into a single device also, such as a single piezo-electric drum.

The three phase modulators are then modulated at three different frequencies, generated from three radio frequency (RF) local oscillators. The output signal (sampled by an appropriate beamsplitter) is detected with a photodiode. The photodiode signal is appropriately amplified, and RF filtered, where a different RF filter can be used for each modulation frequency. Three mixers mix the three filtered photodiode signals with the three corresponding local oscillators, generating three error signals. These error signals are then directed to appropriate integrators, generating the appropriate feedback to the three phase actuators for phase locking.

Additional group delay actuators can further be used to ensure that the group delay of the four amplifiers is matched. The group delay actuators can be controlled on a much slower time scale than the phase delay and appropriately adjusted prior to the engagement of the phase locked loops. For example, in any of the amplifier embodiments, group delay control may occur at about 1-10 Hz, whereas phase control may occur at 10 Hz-100 kHz.

Figure 6:
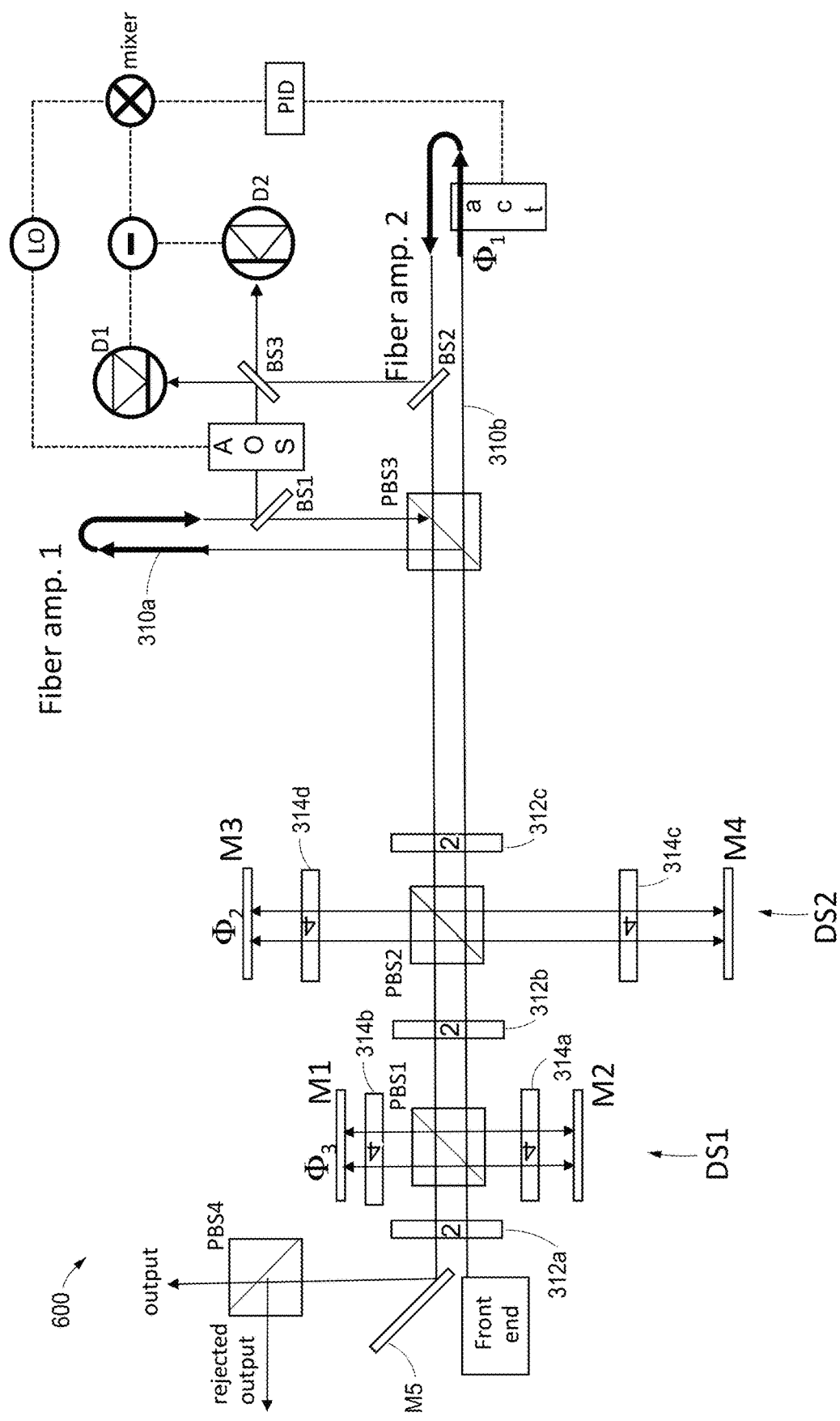
FIG. 6 is a diagram of a high power fiber frequency comb obtained via TDM and SDM.

When using SDM and TDM with high power frequency combs, the application of the dither technique and optical path length modulation may be undesirable for some systems. In this case, the application of classical heterodyne phase locking architectures can be of an advantage for phase locking of fiber amplifiers to each other. FIG. 6 illustrates an example embodiment of such a system 600 in conjunction with an SDM/TDM scheme similar to that described with respect to the system 300 shown in FIG. 4a. Here a small fraction of the outputs from the fiber amplifiers 310a, 310b is diverted via beam splitters BS1 and BS2. The diverted beam from the first amplifier 310a is further frequency shifted with an acousto-optic frequency shifter (AOS). The two beams are then combined with a third beam splitter BS3 and the interference pattern is detected via dual balanced detection with photodetectors D1 and D2. The interference signal is mixed with a local oscillator (LO) operating at a frequency $\Omega$, which also drives the AOS. The mixed signal is then used as the input to a feedback loop, based for example on a proportional-integral-derivative (PID) controller to phase lock the beat signal to the LO via control of an actuator (act) via the PID. As shown in FIG. 6, the actuator is located in amplifier 2 (310b), but it can also be located in amplifier 1 (310a). The actuator can comprise for example a piezo-electrically controlled fiber stretcher. This way the phase of amplifier 1 can be optimally locked to amplifier 2 and a desired phase offset can also be incorporated. Other methods for coherent addition of the frequency combs in amplifiers 1 and 2 can also be implemented. For example, feedforward schemes as discussed by K. Yang, 'Parallel fiber amplifiers with carrier-envelope drift control for coherent combination of optical frequency combs', Laser Physics, vol 24, pp. 125101 (2014) can be used.

A generally similar heterodyne method can also be adapted to coherent addition of more than two frequency combs. When using 4 amplifiers as shown in FIG. 5, a first AOS can be used to phase lock amplifiers 1 and 2 (310a, 310b) and a second AOS can be used to phase lock amplifiers 3 and 4 (310c, 310d). A slow SPGD algorithm can be used to stabilize the path length difference between amplifier pair 1 (comprising amplifiers 1 and 2) and amplifier fiber pair 2 (comprising amplifiers 3 and 4).

Scaling to more than 4 amplifiers and more than 4 pulses is straight forward and can be for example accomplished by adding more beam splitters. Accordingly, in various embodiments, the total number of split pulses is obtained by $N_{tot}=m*n$; for m=4 amplifiers and n=8 pulses propagating in each amplifier, an input pulse can be split into 32 separate pulses and recombined into a single pulse at the output. Whereas in the present examples, the delay stages (e.g., DS1, DS2) are disposed on a single TDM stage, which is used with all the amplifiers, alternative configurations with multiple TDM stages associated with each amplifier can also be used.

Polarimeters and balanced cross correlators as discussed with respect to FIG. 5 may also be conveniently used for coherent combination of frequency combs.

For fiber amplifiers operating at high pulse energies close to the saturation energy of each amplifier, gain saturation effects as well as self-phase modulation in the amplifiers can reduce or limit the combination efficiency of the pulses. This can be rectified by the inclusion of additional optical modulators up-stream of the polarizing beam splitter PBS3. In order to ensure that pulses with equal pulse energy are obtained at the output of the system in the presence of saturation, some embodiment of the amplifier system can include an amplitude modulator, which can attenuate the front end of the pulse train, which receives the maximal gain.

Figure 7:
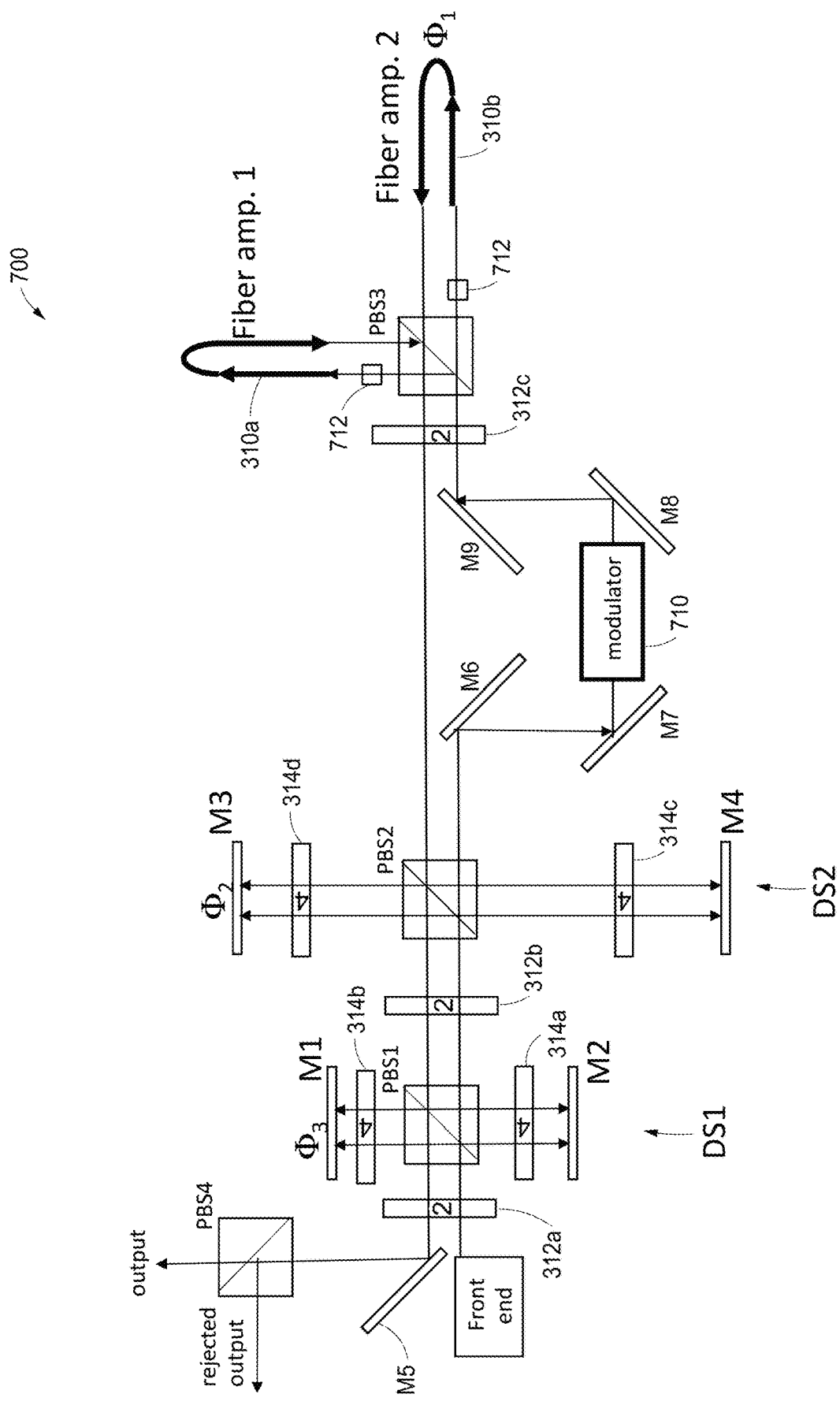
FIG. 7 is a diagram of an embodiment for a high peak power fiber amplifier via a combination of TDM and SDM in combination with additional amplitude and phase modulators for control of amplifier saturation and self-phase modulation in the amplifiers.

An example amplifier system 700 configured to compensate for amplifier saturation is shown in FIG. 7. The system 700 is generally similar to the system 300 described with reference to FIG. 4a and includes a polarization insensitive amplitude modulator 710, which is inserted into the input beam via a set of mirrors M6, M7, M8, and M9 located between the polarizing beam splitters PBS2 and PBS3. Alternatively, amplitude modulators 712 can additionally or alternatively be inserted in front of the input end of both amplifier 1 and amplifier 2. In this case, polarization sensitive amplitude modulators can be used, and a total of two modulators can be used (generally, the number of such modulators can equal the number of amplifier arms). Additional phase modulators can also be inserted to compensate for nonlinear phase modulation inside the optical amplifiers.

Similar modulators can also be used in conjunction with the systems shown in other figures of the application, where in the most general case modulators can be included in front of each amplifier.

Figure 8:
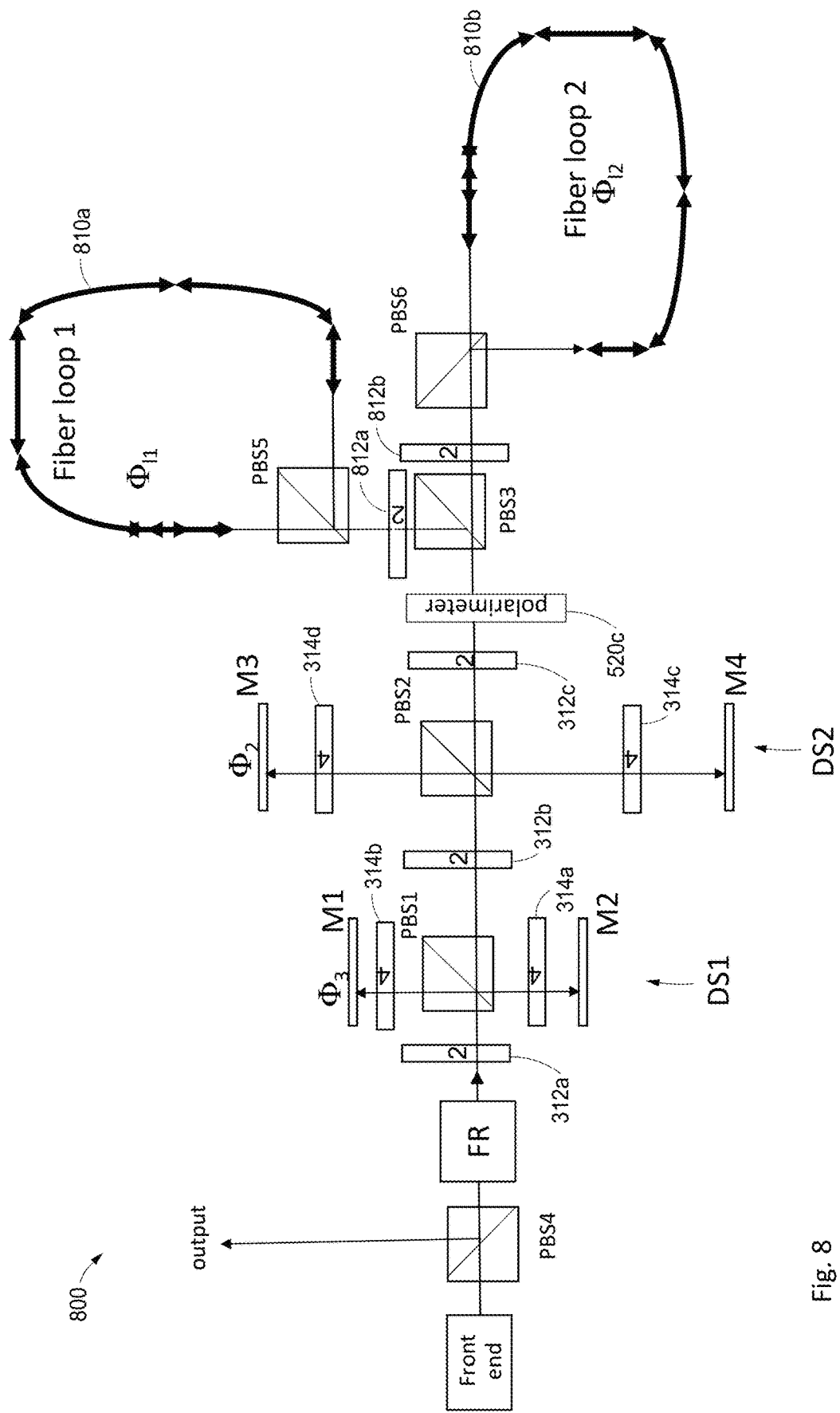
FIG. 8 is a diagram of an embodiment for pulse amplification via TDM and SDM in combination with bi-directional amplifiers.

A significant simplification of system complexity for certain embodiments of TDM and SDM systems can be obtained when using bi-directional propagation through the fiber amplifiers. An example of such an embodiment is shown in FIG. 8. The system 800 is similar to the embodiment 500 described with reference to FIG. 5, but amplifiers 1 and 2 (310a, 310b) from FIG. 5 are now combined into a single bi-directional fiber amplifier loop 1 810a, and amplifiers 3 and 4 (310c, 310d) from FIG. 5 are combined into another bi-directional fiber amplifier loop 2 810b. Both loops 810a, 810b are appropriately aligned to ensure that the same fiber polarization axis in the fiber receives the linearly polarized s and p polarizations reflected at the polarizing beam splitters PBS5 and PBS6, respectively. Due to reciprocity of the loop, the polarization states at the input and output of PBS5 are identical. The same also applies to the polarization states at the input and output of PBS6. However, by appropriately adjusting the phase difference $\Delta_1 = \Phi_{f1} - \Phi_{f2}$ the polarization state at the output of PBS3 is rotated by 90° with respect to the input. Therefore the 4 pulses obtained at the input to the polarizing beam splitter PBS3 are recombined into a single pulse upon back-propagation through the delay stages DS2 and DS1. Since the polarization of the back-propagating light is rotated by 90° with respect to the forward propagating light, a Faraday rotator (FR) and a polarizing beam splitter PBS4 are inserted to divert the output from the system 800.

The system 800 can be very effective in reducing or minimizing self-phase modulation in the amplifiers, since the peak pulse power propagating in either fiber loop is one-sixteenth of the obtained peak output power.

When applying a configuration as described in FIG. 8 to power scaling of frequency combs, measuring the polarization after each combination can be used for stabilizing the combination, as in the previous embodiments (e.g., the system 500). They system 800 includes half-wave plates 812a, 812b disposed downstream of PBS3 and before PBS5 and PBS6, respectively. The half-wave plates 812a, 812b are used for properly propagating pulses having the appropriate phase through the system 800. In this embodiment, one polarimeter 520c is used for measuring and correcting path lengths for the pair of amplifier loops 810a, 810b.

A heterodyne locking method as described with respect to the system 600 of FIG. 6 can additionally or alternatively be used. In such an implementation, analogously to FIG. 6, two outputs from the two fiber loops are extracted via additional beam splitters located between the polarizing beam splitters PBS3 and PBS5 for the first loop 810a and between the polarizing beam splitters PBS3 and PBS6 for the second loop 810b, which are then interfered on an additional beamsplitter to generate a beat signal at a heterodyne frequency produced by an acousto-optic frequency shifter (AOS). A PID feedback loop then controls the differential phase delay along the two loops via inclusion of an appropriate actuator inserted in one of the two loops.

If desired, more fiber loops can be added to the example system 800, for example by adding additional beamsplitters and half-wave plates between PBS6 and the two inputs of fiber amplifier loop 2 810b. Each of those two additional beam splitters then directs the beam to the fiber ends of an additional fiber loop. To lock the phases of all the loops, the LOCSET method can be used, where the phase delay in each loop is modulated at a different frequency. In addition, the group delay in each loop can be adjusted via appropriate actuators such as optical delay lines or fiber stretchers. Balanced cross correlators or polarimeters may further be implemented for controlling the phase between the loops.

With the arrangements discussed above, the power limits of conventional fiber amplifiers can be exceeded by a factor of 10-100, where the average power capability can be in the kW range (e.g., up to about 1 kW, 10 kW, or more). With any arrangement discussed above, also SDM and TDM arrangements with a combination of beam splitters and polarization beam splitters can also be used. For example with respect to the amplifier system 500 shown in FIG. 5, some or all of the polarizing beam splitters PBS1, PBS2, PBS3 can be replaced with beam splitters, whereas the polarizing beam splitters PBS5 and PBS6 remain in place for further splitting of the signal into four amplifiers. Other combinations of polarizing beam splitters and ordinary beam splitters are also possible.

Figure 9:
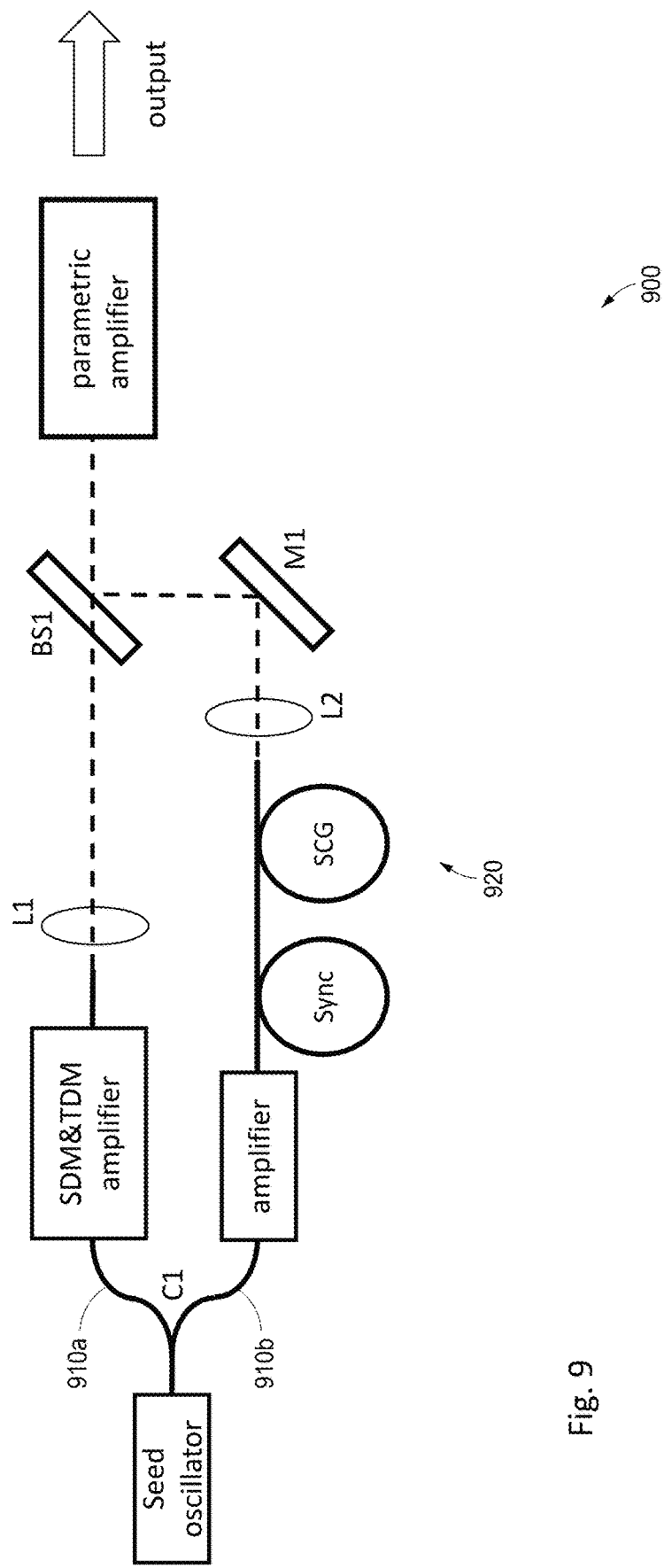
FIG. 9 is a diagram of an example of a parametric amplification system.

An embodiment of a parametric amplification system 900 using a pump source based on SDM/TDM amplifiers as discussed above is shown in FIG. 9. Here the front end comprises a fiber seed oscillator, which is split into two arms 910a, 910b via a coupler C1. The bottom arm 910b is then spectrally broadened using a fiber amplifier and a supercontinuum generation (SCG) stage 920. The SCG stage 920 comprises an SCG fiber (e.g., a highly nonlinear fiber such as, e.g., a photonic crystal fiber) or nonlinear waveguide. The timing of the two arms can be matched by, for example, having a portion of fiber, labeled 'Sync' in FIG. 9, with controlled length, for example by stretching by a piezoelectric transducer or temperature control. The top arm 910a is amplified via an embodiment of the SDM and TDM amplifiers described herein, and the beams from the two arms are combined using collimation lenses L1, L2, mirror M1 and beam splitter BS1 and directed to a parametric amplifier. For example an Er seed oscillator having an operating wavelength at 1550 nm can be used with additional amplification via the SDM/TDM stages as the pump of the parametric amplifier, whereas supercontinuum generation for spectral broadening in the range from 1700-2300 nm can be used as the signal for the parametric amplifier. Thus embodiments of the parametric amplification system 900 can produce an output in the spectral range from $\lambda_1 \approx 4.75$ μm to $\lambda_2 \approx 17.5$ μm, where $1/\lambda_1 = 1/1550$ nm $- 1/2300$ nm and $1/\lambda_2 = 1/1550$ nm $- 1/1700$ nm. With a pump pulse energy of around 100 nJ at 1550 nm and a repetition rate of 100 MHz, average power levels>1 W can so be obtained in the mid-infrared (mid-IR) spectral region using for example an orientation patterned gallium phosphide (OPGaP) crystal in the parametric amplifier.

Figure 10:
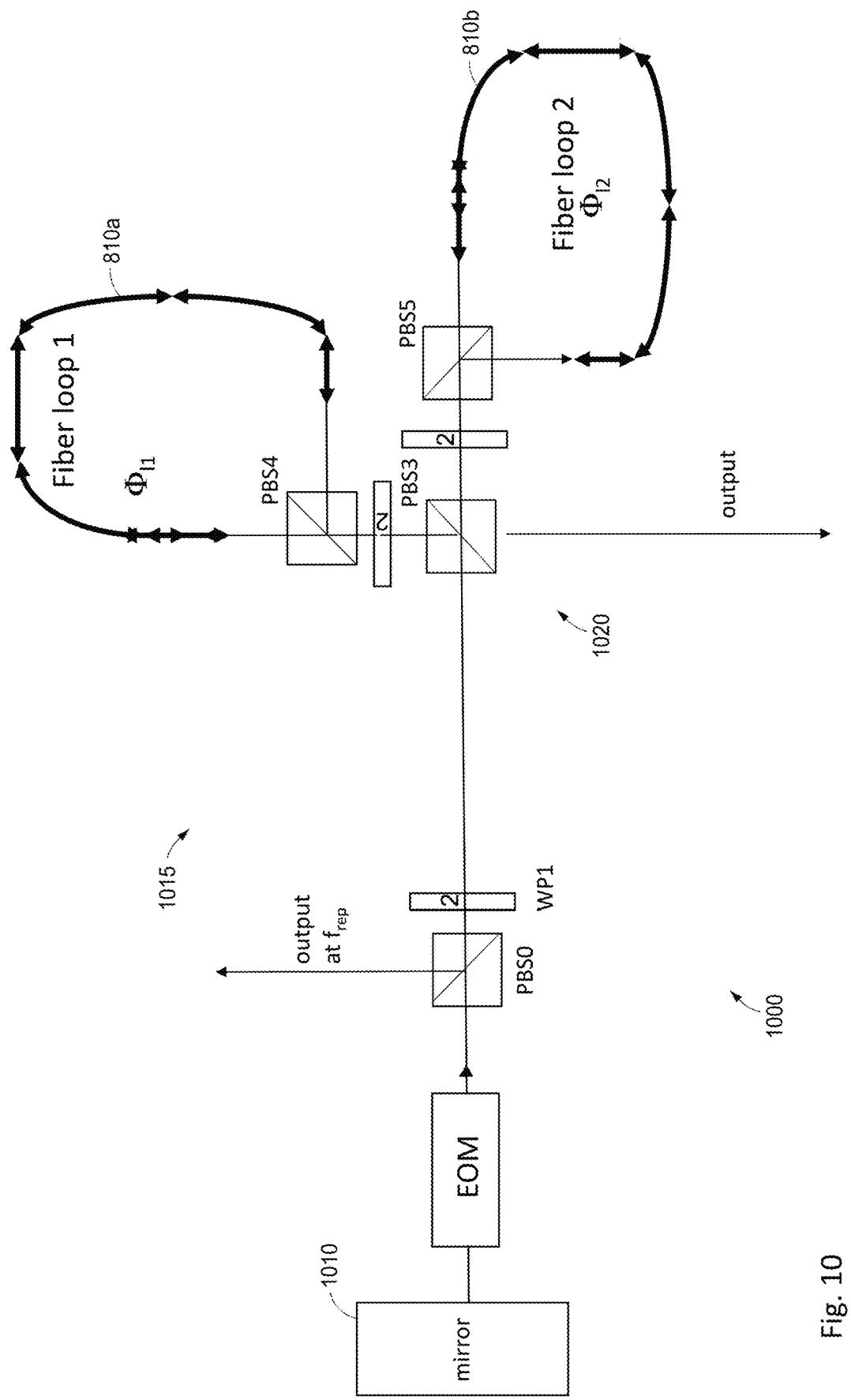
FIG. 10 is a diagram of an example of a modelocked fiber laser incorporating spatial division multiplexing.

Whereas the examples systems described with reference to FIGS. 4a-9 are used in an amplifier configuration, this is for illustration, and various embodiments of such systems can be operated as an oscillator system. For example, the system 800 described with reference to FIG. 8 can be operated as a modelocked oscillator 1000 as shown in FIG. 10. To turn the system 800 in FIG. 8 into an oscillator 1000, the front end seed can be replaced with a mirror 1010. In an embodiment of this implementation, the TDM stage can be omitted (e.g., delay stages DS1 and DS2), and the oscillator can be constructed with two fiber loops 810a, 810b: fiber loop 1 and fiber loop 2. By adjusting the power splitting ratio in the polarizing beam splitter PBS3 to be uneven, the nonlinear phase delay for propagation along the two loops can be adjusted to be different. With an appropriate linear phase bias $-\varphi$ between the two loops, the signal emerging from the two fiber loops and transmitted through PBS3 becomes power dependent. Thus PBS3 and the two fiber loops can be treated as a nonlinear reflector 1020 and serve as the other end of a cavity 1015 between the reflector 1020 and the mirror 1010. Ignoring gain and coupling losses to and out of the loops, the reflectivity R of the reflector 1020 can be written as:

$$R=r^2+t^2+2rt\times\cos(-\varphi+\delta_{n1}),$$

where r is the fraction of the incident light (from the left of PBS3) being reflected at PBS3 and directed to fiber loop 1 and t=1−r is the fraction of the incident light (from the left of PBS3) being transmitted through PBS3 and directed to fiber loop 2. A differential nonlinear phase delay $\delta_{n1}$ exists between the loops 1 and 2. Without phase bias $\varphi$ and no linear phase delay, clearly R=1 and all the light is reflected by the nonlinear reflector 1020. Using a waveplate WP1 disposed upstream of PBS3, the splitting ratio between r and t can be adjusted such that r≠t; hence the differential nonlinear phase delay $\delta_{n1}$ along the two loops becomes power dependent and R can be adjusted to increase with power.

Such power dependent reflectivity of the reflector 1020 can produce self-sustaining passive modelocking and lead to the generation of very short pulses in the cavity 1015. More specifically, the system 1000 operates similarly to an additive pulse modelocked system, but extended to operate in conjunction with the two fiber loops 810a, 810b. To start passive modelocking an electro-optic modulator (EOM) as shown in FIG. 10 can also be used in the cavity 1015.

In contrast to most passive modelocking techniques, some embodiments of the oscillator system 1000 may need adjustment of the phase delay between the two loops 810a, 810b. This can be performed via feedback to the oscillator output power or a carrier envelope offset frequency using for example a fiber stretcher or phase modulator incorporated into one of the loops. The feedback loop is not separately shown in FIG. 10.

In contrast to the laser with non-linear optical loop mirror described in U.S. Pat. No. 9,276,372, no non-reciprocal optical elements are required and the cavity loss can be very low for embodiments of the oscillator system 1000; thus very high repetition rates $f_{rep}$>250 MHz can be obtained for example with an Er fiber as the gain medium of the loops. Moreover, since a pulse is split 4 times and then recombined into 1 single pulse, relatively high pulse energies can be obtained from embodiments of the system 1000. Further repetition rate control can be obtained by for example mounting the end mirror 1010 onto a piezo-electric translation stage (PZT). Thus a full frequency comb can also be readily assembled using an embodiment of the present oscillator 1000. The system can also be extended to incorporate more than two fiber loops for further power scaling.

Additionally or alternatively, in some implementations higher amplification and output energy can be obtained with bulk amplifier(s). For example, at least one bulk, solid state amplifier may be disposed downstream from one or both of the fiber amplifiers 210a, 210b. In some implementations amplification may be achieved with bulk amplifiers alone or in combination with fiber amplifiers, or lower-gain fiber pre-amplifiers.

Figure 11:
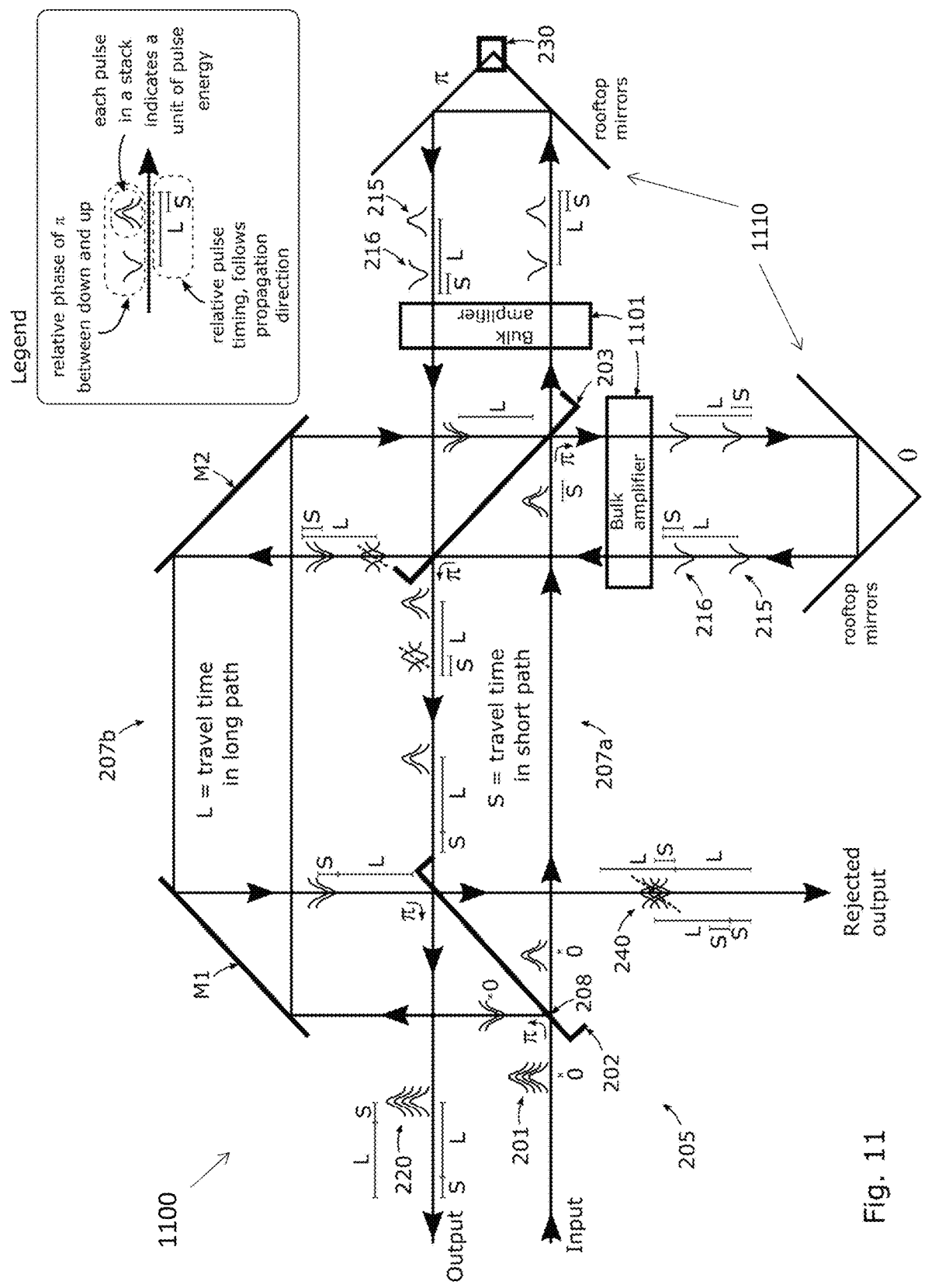
FIG. 11 is a diagram of an embodiment of an amplifier system comprising bulk amplifiers and retroreflectors.

In some arrangements it may beneficial to modify the pulse splitter/combiner arrangement to replace some or all of the fiber amplifiers and coupling optics with a bulk amplifier and a retroreflector such as a mirror pair set to have a 90° angle to return the pulses into said arrangement for recombination. For example, FIG. 11 shows an embodiment of an amplifier system 1100 that is generally similar to the system 200 shown in FIG. 2, but in which the amplifier fibers 210a, 210b and coupling optics 212 have been replaced by bulk amplifiers 1101 and retroreflectors 1110 (e.g., rooftop mirrors). This can simplify the optical alignment of some embodiments of the amplifier system. For example, as illustrated in FIG. 11, sets of time delayed pulses may be amplified with respective two parallel bulk amplifiers, followed by retro-reflection into the splitter/combiner for recombining the pulses. Numerous alternatives are possible.

Additional Aspects and Embodiments

Thus the disclosure has described embodiments of fiber amplifier systems and oscillator systems for coherent combination of laser pulses. Additional non-limiting aspects are described below.

1. An amplifier system for coherent combination of laser pulses, the amplifier comprising: a master seed source configured to output seed pulses; a pulse splitting stage configured to split at least one of the seed pulses into one pair of pulse sets of N time delayed pulses propagating along two different propagation directions, where N is an integer greater than or equal to 2; and two fiber amplifiers comprising a first fiber amplifier and a second fiber amplifier, wherein each of said two fiber amplifiers is configured to receive as input one of said pulse sets containing N pulses and to produce amplified output pulses; said pulse splitting stage further configured to receive said amplified output pulses and to coherently combine said amplified output pulses into substantially a single pulse.

2. The amplifier system according to aspect 1, wherein said single pulse contains >40% of the total energy of the amplified output pulses.

3. An amplifier system for coherent combination of laser pulses according to any one of aspects 1-2, further comprising: an additional pulse splitting element located downstream of said pulse splitting stage, the additional pulse splitting element configured to generate an additional pair of pulse sets containing N pulses each and propagating along two different propagation directions; a fiber amplifier pair, each amplifier of said amplifier pair configured to receive one of said pulse sets propagating along two different propagation directions generated from said additional pulse splitting element as input and producing additional amplified pulses as output; said combination of said pulse splitting stage and said additional pulse splitting element further configured to receive and coherently combine said amplified output pulses and said additional amplified output pulses into substantially said single pulse.

4. An amplifier system according to aspect 3, wherein said single pulse contains >30% of the total energy of the amplified output pulses and the additional amplified output pulses.

5. An amplifier system for coherent combination of laser pulses according to any one of aspects 1 to 4, said pulse splitting stage comprising an optical beam splitter.

6. An amplifier system for coherent combination of laser pulses according to any one of aspects 1 to 5, said pulse splitting stage comprising a polarizing beam splitter.

7. An amplifier system for coherent combination of laser pulses according to any one of aspects 1 to 6, said pulse splitting stage comprising a combination of an optical beam splitter and a polarizing beam splitter.

8. An amplifier system for coherent combination of laser pulses according to any one of aspects 1 to 7, further comprising an actuator configured to control a phase or group delay between the two fiber amplifiers.

9. An amplifier system for coherent combination of laser pulses according to aspect 8 wherein the actuator configured to control phase is controlled by a dither lock.

10. An amplifier system for coherent combination of laser pulses according to aspect 9, wherein said dither lock comprises a modulator configured to modulate a path delay between the two fiber amplifiers at a frequency $\Omega$ and to generate an error signal for manipulating the path delay between the two fiber amplifiers via a lock-in amplifier and at least one actuator configured for path delay manipulation.

11. An amplifier system for coherent combination of laser pulses according to any one of aspects 1 to 10, wherein: at least a first input propagation direction of the set of N pulses configured to be received by said first fiber amplifier is configured to be anti-parallel to a first output propagation direction of the amplified set of N pulses emerging from said first fiber amplifier, said first input propagation direction and said first output propagation direction further configured to be spatially offset with respect to each other.

12. An amplifier system for coherent combination of laser pulses according to any one of aspects 1 to 11, further comprising: a modulator configured to modulate amplitude within a set of N time delayed pulses so as to approximately equalize energy within the pulse sets of pulses propagating inside the first or the second fiber amplifier in the presence of gain saturation.

13. An amplifier system for coherent combination of laser pulses according to aspect 12, further comprising: a phase modulator configured to modulate phase within a set of N time delayed pulses so as to approximately equalize an overall phase delay within the pulse sets propagating inside the first or the second fiber amplifier.

14. An amplifier system for coherent combination of laser pulses according to any one of aspects 1 to 13, further comprising: a first pump source configured to pump the first fiber amplifier and a second pump source configured to pump the second fiber amplifier.

15. An amplifier system for coherent combination of laser pulses according to any one of aspects 1 to 14, further comprising: a pulse stretcher; and a pulse compressor, the system configured to generate ultra-short pulses.

16. An amplifier system for coherent combination of laser pulses according to any one of aspects 1 to 15, further comprising: a pulse picker arranged to select a subset from the pulses generated by said master seed source.

17. An amplifier system for coherent combination of laser pulses according to any one of aspects 1 to 16, further comprising a fiber pre-amplifier located down-stream of said master seed source.

18. An amplifier system for coherent combination of laser pulses according to any one of aspects 1 to 17, wherein said master seed source comprises a modelocked oscillator.

19. An amplifier system for coherent combination of laser pulses according to aspect 18, wherein said modelocked oscillator comprises a fiber laser.

20. An amplifier system for coherent combination of laser pulses according to aspect 19, wherein said fiber laser comprises an Yb, Nd, Er, Er/Yb, Tm, Tm/Yb or Ho doped fiber.

21. An amplifier system for coherent combination of laser pulses according to any one of aspects 1 to 20, further comprising actuators configured to control optical phase or group delay between the two fiber amplifiers, said actuators controlled by dither locking using a different modulation frequency for each actuator.

22. An amplifier system for coherent combination of laser pulses according to any one of aspects 1 to 21, further comprising an actuator configured to control phase between the two fiber amplifiers, the actuator comprising a polarimeter to control the phase between the first fiber amplifier and the second fiber amplifier, said two fiber amplifiers further configured to receive sets of pulses split into two orthogonal polarization directions by a polarization beam splitter.

23. An amplifier system for coherent combination of laser pulses according to any one of aspects 1 to 22, further comprising an actuator control using a slow genetic or a slow stochastic parallel gradient descent algorithm (SPGD) technique to increase or maximize pulse energy in the coherently combined single pulse.

24. An amplifier system for frequency combs, the amplifier system comprising: one master comb source configured to generate seed pulses; a pulse splitting stage configured to split at least one of the seed pulses into one pair of individual pulse sets of N time delayed pulses propagating along two different propagation directions, where N is an integer ≥2; at least two fiber amplifiers, each of said at least two fiber amplifiers configured to receive one of said pulse sets containing N pulses as input and to produce amplified pulses as output; said pulse splitting stage further configured to receive said amplified output pulses and to coherently combine said amplified output pulses into substantially a single pulse, wherein said coherently combined single pulse comprises a frequency comb.

25. An amplifier system for frequency combs according to aspect 24, wherein said coherently combined single pulse contains >40% of the total energy of the amplified output pulses.

26. An amplifier system for frequency combs according to aspect 24 or aspect 25, further comprising: an additional pulse splitting element located down-stream of said pulse splitting stage, the additional pulse splitting element configured to generate an additional pair of pulse sets containing M pulses each and propagating along two different propagation directions; a fiber amplifier pair, each amplifier of said amplifier pair configured to receive one of said additional pulse sets propagating along two different propagation directions generated from said additional pulse splitting element as input and producing additional amplified pulses as output; said combination of said pulse splitting stage and said additional pulse splitting element further configured to receive and coherently combine said amplified output pulses and said additional amplified output pulses into substantially said single pulse, wherein said coherently combined single pulse comprises a frequency comb.

27. An amplifier system for frequency combs according to aspect 26, wherein said single pulse contains >30% of the total energy of the amplified output pulses and the additional amplified output pulses.

28. An amplifier system for frequency combs according to any one of aspects 24 to 27, further comprising: at least one acousto-optic frequency shifter to shift the frequency of one set of pulses belonging to a pulse set pair, wherein two sets of pulses of said pulse set pair are configured to generate a heterodyne beat frequency; and a feedback loop to stabilize the phase of said heterodyne beat frequency via control of the phase between said two sets of pulses.

29. An amplifier system for coherent combination of laser pulses, said amplifier system comprising: one master seed source; a pulse splitting stage configured to split at least one of the seed pulses into one pair of individual pulse sets of N time delayed pulses propagating along two different propagation directions, where N is an integer ≥2; additional pulse splitting elements configured to split each of said pulse sets into two additional sets of pulses via a polarization beam splitter, generating four individual sets of M time delayed pulses, where M≥N; a first fiber amplifier and a second fiber amplifier, each amplifier configured to receive one of said individual pulse sets at a first end and to produce amplified output pulses at a second end; said pulse splitting stage and additional pulse splitting elements further configured to receive said amplified output pulses and to coherently combine said amplified output pulses into substantially a single pulse.

30. An amplifier system for coherent combination of laser pulses according to aspect 29, wherein said single pulse contains >40% of the total energy of the amplified output pulses.

31. An amplifier system for coherent combination of laser pulses, said amplifier system comprising: a laser source configured to output a seed pulse; a first pulse splitting stage configured to split the seed laser pulse into a first pulse set and a second pulse set, each of said first and second pulse sets containing N time-split pulses propagating along two different propagation directions, where N is an integer ≥2; at least a second pulse splitting stage configured to receive the first pulse set and the second pulse set and to further split the first and second pulses sets into at least a third pulse set and a fourth pulse set containing M≥N time-split pulses propagating along different propagation directions; and a plurality of fiber amplifiers configured to receive the at least third and fourth pulse sets and to produce amplified return pulses; wherein the at least second pulse splitting stage and the first splitting stage are configured to receive said amplified return pulses and to coherently combine said amplified return pulses into substantially a single output pulse.

32. An amplifier system for coherent combination of laser according to aspect 31, further comprising an actuator disposed along at least one of the plurality of fiber amplifiers and configured to control a relative phase of at least some of the amplified return pulses.

33. An amplifier system for coherent combination of laser pulses, said amplifier system comprising: a laser source configured to output a seed pulse; a pulse splitting stage configured to receive the seed pulse and to produce a plurality of time-split pulses; and an amplification stage comprising a plurality of amplifiers, the amplification stage configured to receive the plurality of time-split pulses and to produce a plurality of amplified return pulses, wherein at least one of the plurality of amplifiers is configured such that an input propagation direction of the pulses to be received by said at least one amplifier is anti-parallel to an output propagation direction of amplified pulses emerging from said at least one amplifier, wherein said input propagation direction and said output propagation direction are spatially offset with respect to each other, wherein said pulse splitting stage is configured to receive said plurality of amplified return pulses and to coherently combine said plurality of amplified return pulses into substantially a single output pulse.

34. An amplifier system for coherent combination of laser pulses according to aspect 33, wherein said plurality of amplifiers comprises a fiber amplifier.

35. An amplifier system for coherent combination of laser pulses according to aspect 33 or aspect 34, wherein said plurality of amplifiers comprises a bulk amplifier and a retroreflector.

36. A system for coherent combination of laser pulses, the system comprising: a seed source configured to output seed pulses; an input comprising an input pulse generated by said seed source; a pulse splitter/combiner arrangement configured to split said pulse into a plurality of N time delayed pulses propagating along at least two different propagation directions, where N is an integer greater than or equal to 2, said delayed pulses each having reduced pulse energy relative to said input pulse; optical amplifiers comprising a first fiber amplifier and a second fiber amplifier, wherein each of said first and second fiber amplifiers is configured to receive at least two pulses at an input end and to provide amplified pulses at an output end of the respective fiber amplifier, wherein said first and second fiber amplifiers each comprise a section that is arranged in loop, with a first segment of the fiber where pulses are input that is spatially offset from a second segment of the fiber where pulses are output and with the loop disposed downstream of the first segment and upstream of the second segment, and configured such that amplified pulses from said first fiber amplifier and from said second fiber amplifier are re-directed into said pulse splitter/combiner arrangement; and an actuator operably configured to control phase variations of at least one of said first and second fiber amplifiers; wherein said pulse splitter/combiner arrangement is further configured to receive said amplified output pulses and to coherently combine said amplified output pulses into a single, high energy output pulse with pulse energy substantially greater than said input pulse.

37. The system for coherent combination of laser pulses according to aspect 36, wherein said loop comprises a partially open loop.

38. The system for coherent combination of laser pulses according to aspect 36 or aspect 37, wherein: optical pulses entering an input end and exiting an output end of a fiber amplifier are arranged to share a clear aperture of a common beam splitting optical element, and said fiber amplifier and said common beam splitting optical element operably arranged in such a way as to effectively retro-reflect a pulse entering said input end with a lateral displacement between said fiber input end and said fiber output end, wherein an amplified pulse exits said output end and enters said pulse splitter/combiner arrangement.

39. The system for coherent combination of laser pulses according to any one of aspects 36 to 38, wherein said pulse splitter/combiner arrangement comprises a Mach-Zehnder interferometer comprising beam splitters and mirrors.

40. The system for coherent combination of laser pulses according to any one of aspects 36 to 39, wherein said system is configured with combined output pulses spatially offset relative to said input pulses, thereby providing for extraction of recombined pulses without any non-reciprocal optical elements.

41. The system for coherent combination of laser pulses according to any one of aspects 36 to 40, wherein said actuator is configured to actively control feedback and configured with one of more of the following: a dither locking mechanism, a phase modulator, or a fiber stretcher.

42. The system for coherent combination of laser pulses according to any one of aspects 36 to 41, wherein said splitter/combiner arrangement is arranged to progressively split said input pulse into N time-delayed pulses with a reciprocal arrangement of non-polarizing beam splitting elements configured in an optical delay line.

43. The system for coherent combination of laser pulses according to any one of aspects 36 to 42, wherein said optical amplifiers further comprise at least one bulk, solid state amplifier disposed downstream from one or both of said first fiber amplifier and said second fiber amplifier.

44. A system for coherent combination of laser pulses, the system comprising: a seed source configured to output seed pulses; an input comprising an input pulse generated by said seed source; a pulse splitter/combiner arrangement configured to split said pulse into a pair of pulse sets, said pulse sets comprising N time delayed pulses propagating along at least two different primary propagation directions, where N is an integer greater than or equal to 2; two secondary beam splitting arrangements inserted down-stream from said pulse splitter/combiner arrangement and configured to split said pair of pulse sets into another two secondary pulse sets comprising N time delayed pulses; two optical amplifiers configured as loops, each optical amplifier configured to receive one of said secondary pulse sets at its respective distal end, each optical amplifier configured to output one set of amplified pulses, said resulting two sets of amplified pulses configured to propagate along two different secondary propagation directions, said primary and secondary propagation directions being anti-parallel with respect to each other, said primary pulse splitter/combiner arrangement further configured to receive said two sets of amplified output pulses and to coherently combine said two sets of amplified output pulses into a single, high energy output pulse with pulse energy substantially greater than said input pulse.

45. The system for coherent combination of laser pulses according to aspect 44, wherein said loops comprise at least one partially open loop.

46. The system for coherent combination of laser pulses according to any one of aspects 44 to 45, wherein said pulse splitter/combiner arrangement comprises a Mach-Zehnder interferometer comprising beam splitters and mirrors.

47. The system for coherent combination of laser pulses according to any one of aspects 44 to 46, further comprising at least one actuator is configured to actively control the phase or group delay between the two optical amplifiers.

48. The system for coherent combination of laser pulses according to aspect 47, wherein said at least one actuator comprises one or more of the following: a phase modulator, a fiber stretcher, a piezo-electric translation stage (PZT), or a delay stage.

49. The system for coherent combination of laser pulses according to any one of aspects 44 to 48, wherein said two optical amplifiers further comprise at least one bulk, solid state amplifier disposed downstream from one or both of said two optical amplifiers.

50. The system for coherent combination of laser pulses according to any one of aspects 44 to 49, where said two optical amplifiers comprise fiber amplifiers.

51. The system for coherent combination of laser pulses according to any one of aspects 44 to 50, wherein said loops comprise optical fiber having a gain medium.

Additional Considerations

Thus, the invention has been described in several non-limiting embodiments. It is to be understood that the embodiments are not mutually exclusive, and elements described in connection with one embodiment may be combined with, rearranged, or eliminated from, other embodiments in suitable ways to accomplish desired design objectives. No single feature or group of features is necessary or required for each embodiment.

For purposes of summarizing the present invention, certain aspects, advantages and novel features of the present invention are described herein. It is to be understood, however, that not necessarily all such advantages may be achieved in accordance with any particular embodiment. Thus, the present invention may be embodied or carried out in a manner that achieves one or more advantages without necessarily achieving other advantages as may be taught or suggested herein.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" or "an" or "the" as used in this application and the appended claims are to be construed to mean "one or more" or "at least one" unless specified otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

The above description of various embodiments has been given by way of example. From the disclosure given, those skilled in the art will not only understand the present disclosure and its attendant advantages, but will also find apparent various changes and modifications to the structures and methods disclosed. It is sought, therefore, to cover all such changes and modifications as fall within the spirit and scope of the disclosure, as defined by the appended claims, and equivalents thereof.

What is claimed is:

1. An amplifier system for coherent combination of laser pulses, the amplifier system comprising:
   a master seed source configured to output seed pulses;
   a pulse splitting stage configured to split at least one of the seed pulses into one pair of pulse sets of N time delayed pulses propagating along two different propagation directions, where N is an integer greater than or equal to 2; and
   two fiber amplifiers comprising a first fiber amplifier and a second fiber amplifier, wherein each of said two fiber amplifiers is configured to receive as input one of said pulse sets containing N pulses and to produce amplified output pulses;
   said pulse splitting stage further configured to receive said amplified output pulses and to coherently combine said amplified output pulses into substantially a single pulse.

2. The amplifier system according to claim 1, wherein said single pulse contains greater than 40% of the total energy of the amplified output pulses.

3. An amplifier system for coherent combination of laser pulses according to claim 1, further comprising:
   an additional pulse splitting element located down-stream of said pulse splitting stage, the additional pulse splitting element configured to generate an additional pair of pulse sets containing N pulses each and propagating along two different propagation directions;
   a fiber amplifier pair, each amplifier of said fiber amplifier pair configured to receive one of said pulse sets propagating along two different propagation directions generated from said additional pulse splitting element as input and producing additional amplified pulses as output;
   said combination of said pulse splitting stage and said additional pulse splitting element further configured to receive and coherently combine said amplified output pulses and said additional amplified output pulses into substantially said single pulse.

4. An amplifier system according to claim 3, wherein said single pulse contains greater than 30% of the total energy of the amplified output pulses and the additional amplified output pulses.

5. An amplifier system for coherent combination of laser pulses according to claim 1, said pulse splitting stage comprising an optical beam splitter.

6. An amplifier system for coherent combination of laser pulses according to claim 1, said pulse splitting stage comprising a polarizing beam splitter.

7. An amplifier system for coherent combination of laser pulses according to claim 1, said pulse splitting stage comprising a combination of an optical beam splitter and a polarizing beam splitter.

8. An amplifier system for coherent combination of laser pulses according to claim 1, further comprising an actuator configured to control a phase or group delay between the two fiber amplifiers.

9. An amplifier system for coherent combination of laser pulses according to claim 8, wherein the actuator configured to control phase is controlled via a dither lock.

10. An amplifier system for coherent combination of laser pulses according to claim 9, wherein said dither lock comprises a modulator configured to modulate a path delay between the two fiber amplifiers at a frequency $\Omega$ and to generate an error signal for manipulating the path delay between the two fiber amplifiers via a lock-in amplifier and at least one actuator configured for path delay manipulation.

11. An amplifier system for coherent combination of laser pulses according to claim 1, wherein:
   at least a first input propagation direction of the set of N pulses configured to be received by said first fiber amplifier is configured to be anti-parallel to a first output propagation direction of the amplified set of N pulses emerging from said first fiber amplifier, said first input propagation direction and said first output propagation direction further configured to be spatially offset with respect to each other.

12. An amplifier system for coherent combination of laser pulses according to claim 1, further comprising:
   a modulator configured to modulate amplitude within a set of N time delayed pulses so as to approximately equalize energy within the pulse sets of pulses propagating inside the first or the second fiber amplifier in the presence of gain saturation.

13. An amplifier system for coherent combination of laser pulses according to claim 12, further comprising:
   a phase modulator configured to modulate phase within a set of N time delayed pulses so as to approximately equalize an overall phase delay within the pulse sets propagating inside the first or the second fiber amplifier.

14. An amplifier system for coherent combination of laser pulses according to claim 1, further comprising:
   a first pump source configured to pump the first fiber amplifier and a second pump source configured to pump the second fiber amplifier.

15. An amplifier system for coherent combination of laser pulses according to claim 1, further comprising:
   a pulse stretcher; and
   a pulse compressor, the amplifier system configured to generate ultra-short pulses.

16. An amplifier system for coherent combination of laser pulses according to claim 1, further comprising:
   a pulse picker arranged to select a subset from the pulses generated by said master seed source.

17. An amplifier system for coherent combination of laser pulses according to claim 1, further comprising a fiber pre-amplifier located down-stream of said master seed source.

18. An amplifier system for coherent combination of laser pulses according to claim 1, wherein said master seed source comprises a modelocked oscillator.

19. An amplifier system for coherent combination of laser pulses according to claim 18, wherein said modelocked oscillator comprises a fiber laser.

20. An amplifier system for coherent combination of laser pulses according to claim 19, wherein said fiber laser comprises an Yb, Nd, Er, Er/Yb, Tm, Tm/Yb or Ho doped fiber.

21. An amplifier system for coherent combination of laser pulses according to claim 1, further comprising:
   actuators configured to control optical phase or group delay between the two fiber amplifiers,
   said actuators controlled by dither locking using a different modulation frequency for each actuator.

22. An amplifier system for coherent combination of laser pulses according to claim 1, further comprising:

an actuator configured to control phase between the two fiber amplifiers, the actuator comprising a polarimeter to control the phase between the first fiber amplifier and the second fiber amplifier, said two fiber amplifiers further configured to receive sets of pulses split into two orthogonal polarization directions by a polarization beam splitter.

23. An amplifier system for coherent combination of laser pulses according to claim 1, further comprising:

an actuator control using a slow genetic or a slow stochastic parallel gradient descent algorithm (SPGD) technique to increase or maximize pulse energy in the coherently combined single pulse.

24. An amplifier system for coherent combination of laser pulses according to claim 1, wherein:

said master seed source comprises a master comb source, and said single pulse comprises a frequency comb.

25. An amplifier system for coherent combination of laser pulses according to claim 24, wherein said one pair of pulse sets comprises a first pulse set and a second pulse set, the amplifier system further comprising:

at least one acousto-optic frequency shifter configured to shift the frequency of the first pulse set to provide a shifted pulse set, wherein said shifted pulse set and said second pulse set are configured to generate a heterodyne beat frequency; and a feedback loop configured to stabilize a phase of said heterodyne beat frequency via control of a phase between said shifted pulse set and said second pulse set.

26. An amplifier system for coherent combination of laser pulses according to claim 1, wherein the pair of pulse sets comprises a first pulse set and a second pulse set, the amplifier system further comprising:

at least a second pulse splitting stage configured to receive the first pulse set and the second pulse set and to further split the first and second pulse sets into at least a third pulse set and a fourth pulse set containing M≥N time-split pulses propagating along different propagation directions.

27. An amplifier system for coherent combination of laser pulses according to claim 1, wherein:

said first fiber amplifier is configured such that an input propagation direction of the pulses to be received by said two amplifiers is anti-parallel to an output propagation direction of amplified pulses emerging from said two fiber amplifiers.

28. An amplifier system for coherent combination of laser pulses according to claim 27, wherein said input propagation direction and said output propagation direction are spatially offset with respect to each other.

29. An amplifier system for coherent combination of laser pulses according to claim 1, wherein at least one of said first or second fiber amplifiers comprises a bulk amplifier and a retroreflector.

30. An amplifier system for coherent combination of laser pulses according to claim 1, wherein:

said first and second fiber amplifiers each comprise a section that is arranged in a loop, with a first segment of the fiber where pulses are input that is spatially offset from a second segment of the fiber where pulses are output, and with the loop disposed downstream of the first segment and upstream of the second segment, and configured such that amplified pulses from said first fiber amplifier and from said second fiber amplifier are re-directed into said pulse splitting stage.

31. An amplifier system for coherent combination of laser pulses according to claim 30, wherein said loop comprises a partially open loop.

32. An amplifier system for coherent combination of laser pulses according to claim 30, further comprising an actuator operably configured to control phase variations of at least one of said first and second fiber amplifiers.

33. An amplifier system for coherent combination of laser pulses according to claim 32, wherein said actuator is configured to actively control feedback and configured with one of more of the following: a dither locking mechanism, a phase modulator, or a fiber stretcher.

* * * * *